US012656174B2

(12) United States Patent
Saado et al.

(10) Patent No.: US 12,656,174 B2
(45) Date of Patent: Jun. 16, 2026

(54) WAVEGUIDE PHOTO DETECTOR INTEGRATED WITH A PLURALITY OF OPTICAL FEEDING WAVEGUIDE PORTS

(71) Applicant: DustPhotonics, Modiin (IL)

(72) Inventors: Yuval Saado, Jerusalem (IL); Moshe Zadka, Jerusalem (IL)

(73) Assignee: DustPhotonics, Modiin (IL)

( * ) Notice: Subject to any disclaimer, the term of this patent is extended or adjusted under 35 U.S.C. 154(b) by 145 days.

(21) Appl. No.: 18/686,847

(22) PCT Filed: Aug. 26, 2022

(86) PCT No.: PCT/IB2022/057988
§ 371 (c)(1),
(2) Date: Feb. 26, 2024

(87) PCT Pub. No.: WO2023/026239
PCT Pub. Date: Mar. 2, 2023

(65) Prior Publication Data
US 2025/0130102 A1 Apr. 24, 2025

Related U.S. Application Data

(60) Provisional application No. 63/368,251, filed on Jul. 12, 2022, provisional application No. 63/260,620, filed on Aug. 26, 2021.

(51) Int. Cl.
*G01J 1/44* (2006.01)
*G02B 6/28* (2006.01)
*G02B 6/42* (2006.01)

(52) U.S. Cl.
CPC .............. *G01J 1/44* (2013.01); *G02B 6/2813* (2013.01); *G02B 6/2821* (2013.01);
(Continued)

(58) Field of Classification Search
CPC ......................... G02B 6/2821; G01J 2001/444
See application file for complete search history.

(56) References Cited

U.S. PATENT DOCUMENTS

| 3,679,307 A | 7/1972 | Zoot et al. |
| 5,139,556 A | 8/1992 | Caldera et al. |

(Continued)

FOREIGN PATENT DOCUMENTS

| JP | 2010287623 A | 12/2010 |

*Primary Examiner* — Thanh Luu
(74) *Attorney, Agent, or Firm* — Reches Patents

(57) ABSTRACT

There may be provided a silicon photonics unit that may include an input waveguide that is configured to convey an input optical signal; a distribution unit (DU) that comprises a DU input port, a first DU output port, a second DU output port and a distribution core; wherein the distribution core is configured to receive the input optical signal, split the input optical signal to a first optical signal and a second optical signal, provide the first optical signal to the first DU output port and provide the second optical signal to the second DU output port; a photodetector (PD) that comprises a PD's first optical input port, a PD's second optical input port, and a PD's electrical output port; wherein the PD is configured to output, via the PD output port, a PD output signal indicative of the first optical signal and the second optical signal; a first optical path that comprises a first waveguide and is configured to convey the first optical signal to the PD's first optical input port; and a second optical path that comprises a second waveguide and is configured to convey the second optical signal to the PD's second optical input port.

19 Claims, 22 Drawing Sheets

(52) U.S. Cl.
    CPC ...... *G02B 6/4296* (2013.01); *G01J 2001/444*
                  (2013.01); *G01J 2001/446* (2013.01)

(56) References Cited

U.S. PATENT DOCUMENTS

| | | | |
|---|---|---|---|
| 2016/0161691 A1 | 6/2016 | Hayakawa | |
| 2016/0248519 A1* | 8/2016 | Novack | H04B 10/6971 |
| 2017/0048016 A1 | 2/2017 | Li et al. | |
| 2017/0261605 A1 | 9/2017 | Chu | |
| 2017/0329080 A1* | 11/2017 | Sahni | G02B 6/4215 |
| 2018/0039153 A1 | 2/2018 | Hashemi et al. | |
| 2019/0212506 A1 | 7/2019 | Fujimura et al. | |
| 2019/0289373 A1 | 9/2019 | Roth | |
| 2022/0413215 A1* | 12/2022 | Lin | G02B 6/12019 |

* cited by examiner

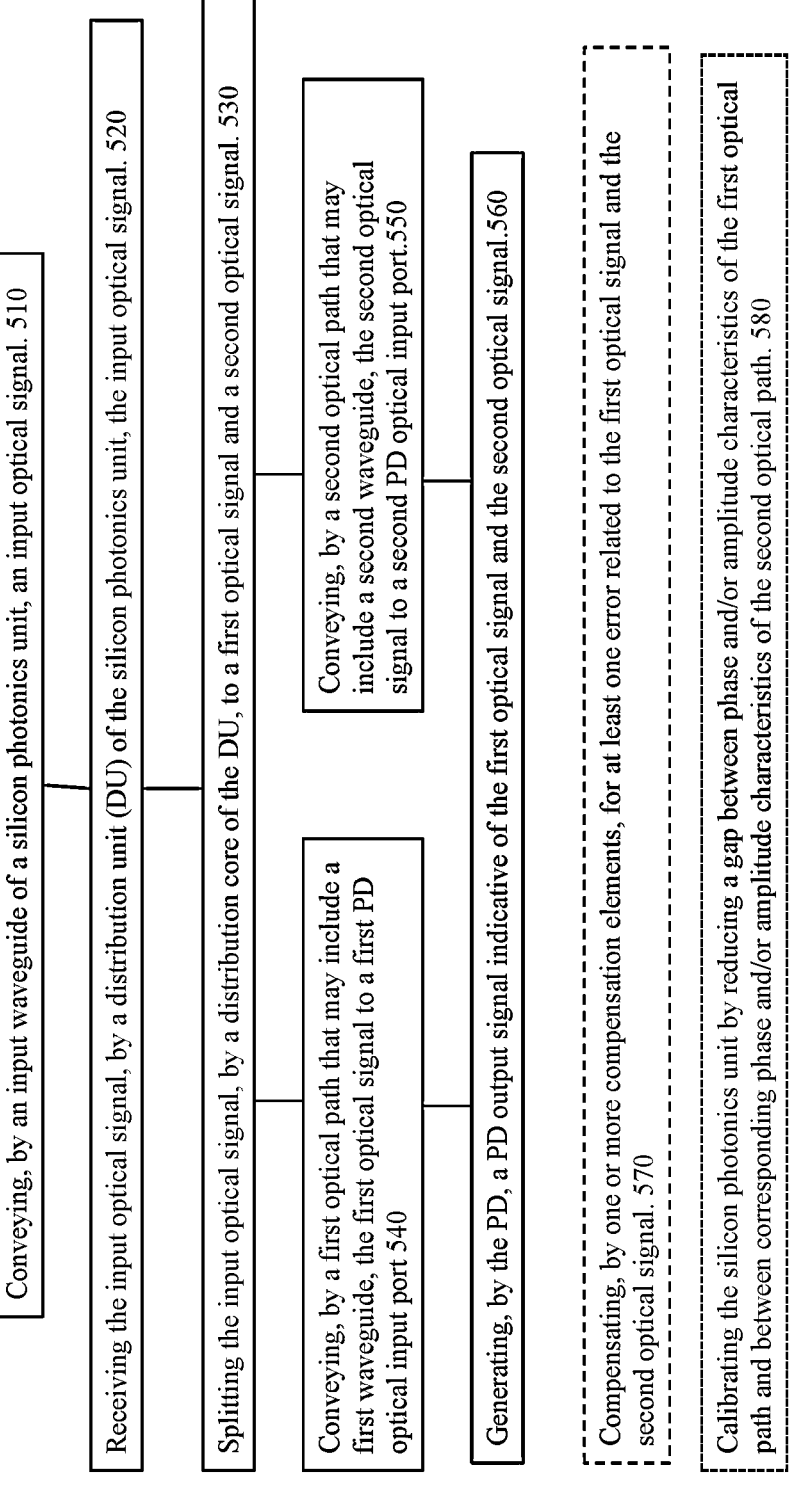

Conveying, by an input waveguide of a silicon photonics unit, an input optical signal. 510

Receiving the input optical signal, by a distribution unit (DU) of the silicon photonics unit, the input optical signal. 520

Splitting the input optical signal, by a distribution core of the DU, to a first optical signal and a second optical signal. 530

Conveying, by a first optical path that may include a first waveguide, the first optical signal to a first PD optical input port 540

Conveying, by a second optical path that may include a second waveguide, the second optical signal to a second PD optical input port.550

Generating, by the PD, a PD output signal indicative of the first optical signal and the second optical signal.560

Compensating, by one or more compensation elements, for at least one error related to the first optical signal and the second optical signal. 570

Calibrating the silicon photonics unit by reducing a gap between phase and/or amplitude characteristics of the first optical path and between corresponding phase and/or amplitude characteristics of the second optical path. 580

Figure 25:
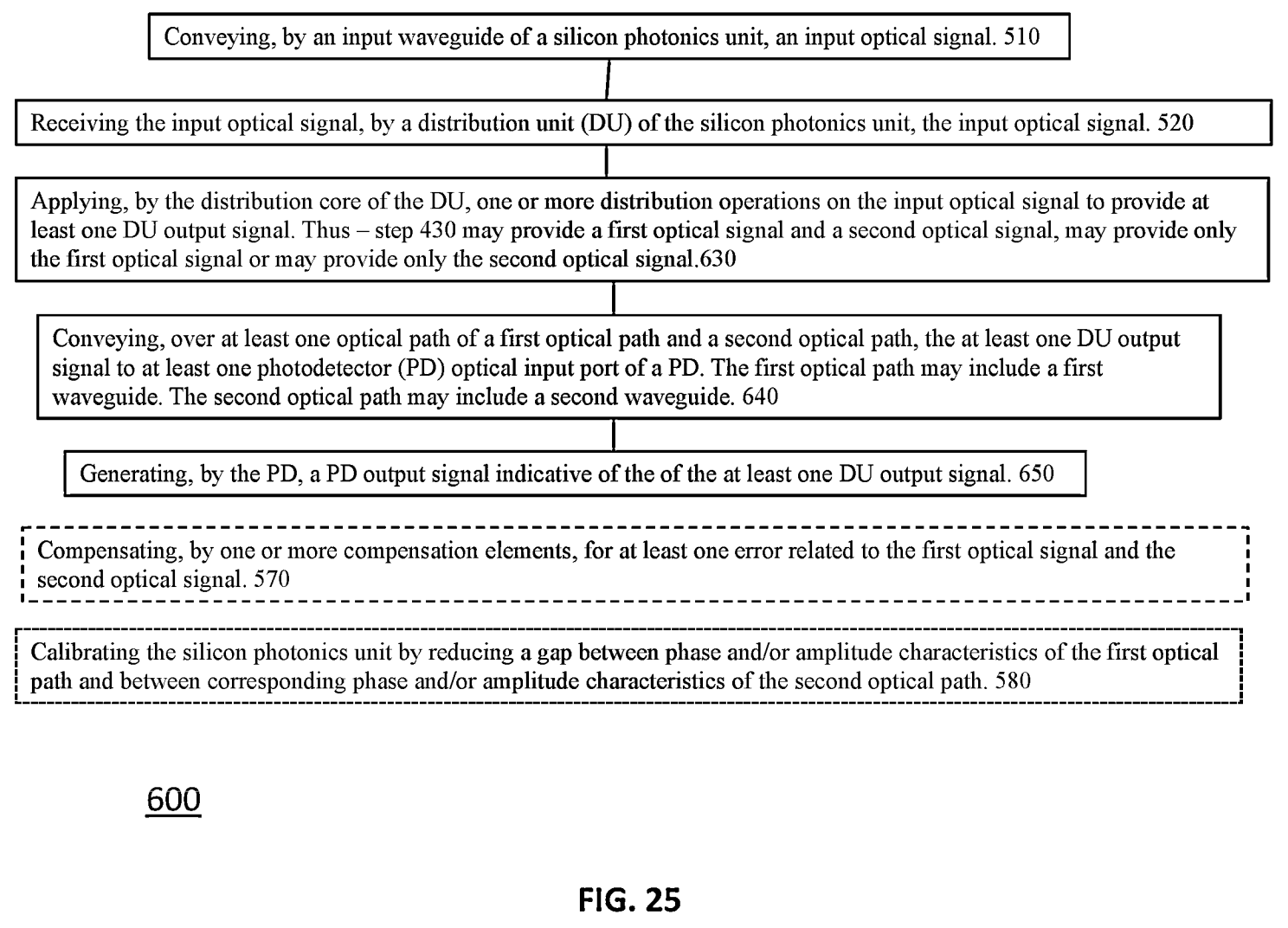

Conveying, by an input waveguide of a silicon photonics unit, an input optical signal. 510

Receiving the input optical signal, by a distribution unit (DU) of the silicon photonics unit, the input optical signal. 520

Applying, by the distribution core of the DU, one or more distribution operations on the input optical signal to provide at least one DU output signal. Thus – step 430 may provide a first optical signal and a second optical signal, may provide only the first optical signal or may provide only the second optical signal.630

Conveying, over at least one optical path of a first optical path and a second optical path, the at least one DU output signal to at least one photodetector (PD) optical input port of a PD. The first optical path may include a first waveguide. The second optical path may include a second waveguide. 640

Generating, by the PD, a PD output signal indicative of the of the at least one DU output signal. 650

Compensating, by one or more compensation elements, for at least one error related to the first optical signal and the second optical signal. 570

Calibrating the silicon photonics unit by reducing a gap between phase and/or amplitude characteristics of the first optical path and between corresponding phase and/or amplitude characteristics of the second optical path. 580

Figure 26:
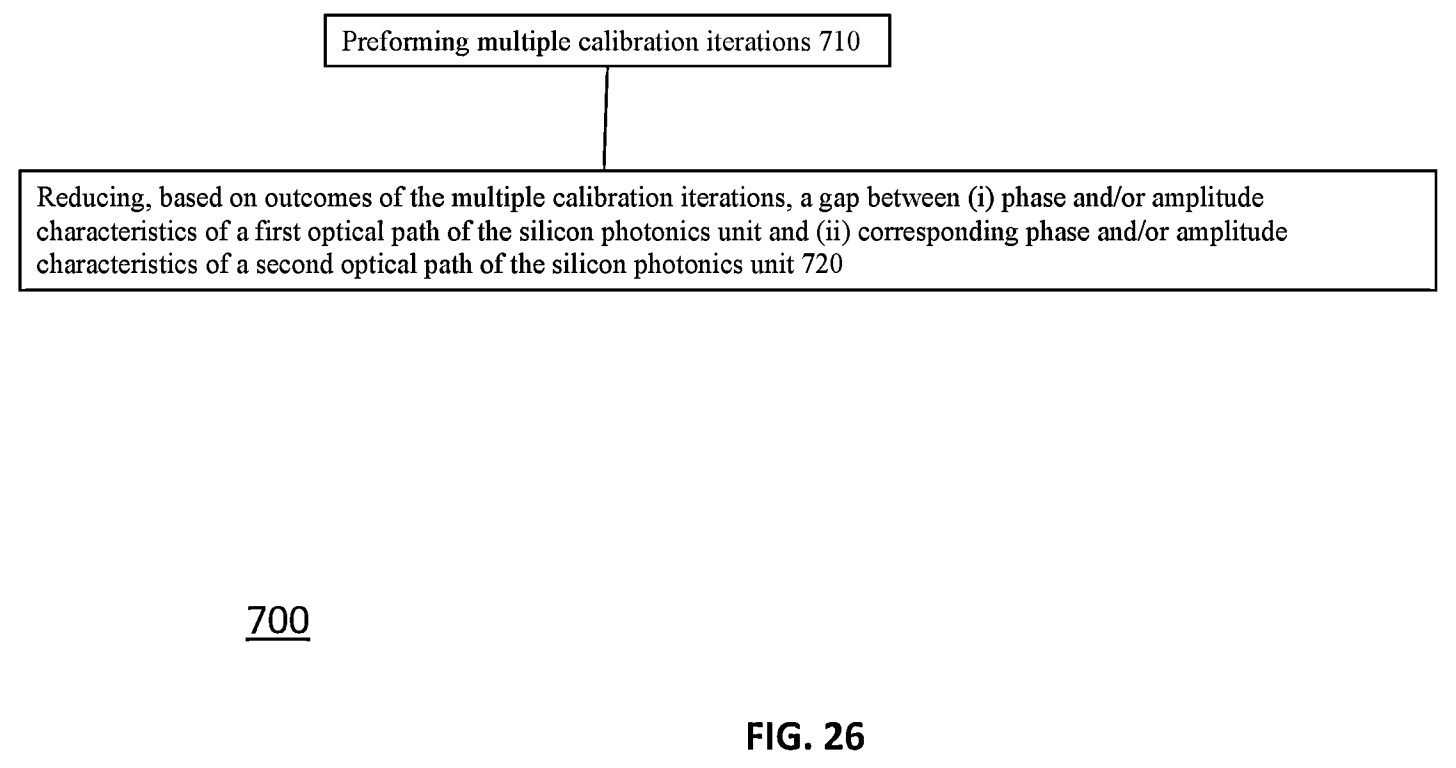

Preforming multiple calibration iterations 710

Reducing, based on outcomes of the multiple calibration iterations, a gap between (i) phase and/or amplitude characteristics of a first optical path of the silicon photonics unit and (ii) corresponding phase and/or amplitude characteristics of a second optical path of the silicon photonics unit 720

WAVEGUIDE PHOTO DETECTOR INTEGRATED WITH A PLURALITY OF OPTICAL FEEDING WAVEGUIDE PORTS

CROSS REFERENCE

This application claims priority from U.S. provisional patent 63/260,620 filing date Aug. 26, 2021 and from U.S. provisional patent 63/368,251 filing date Jul. 12, 2022, both incorporated in their entirety.

BACKGROUND

There is a need for high power and high bandwidth (BW) Photo Detectors (PD) devices that are based Silicon Photonics (SiP) integrated circuit. PD devices are used in the SiP technology as building blocks of Photonic Integrated Circuits (PIC). In particular applications, the PD devices on chip are integrated inside optical receivers of transceiver devices which operate inside optical communication systems and data centers. The PD design and its external and internal coupling means inside the PIC are designed to achieve optimal coupling of the input optical carrier signal at wavelength range of 800-1600 nm (examples of wavelengths that are used for optical communication systems are: 850 nm, 1310 nm and 1550 nm).

In these applications, PD devices are designed to achieve low dark current, high responsivity and maximum bandwidth with additional optimal coupling efficiency to an external optical fiber. A PIC generally suffers from high optical loss reduces the input optical light that arrives to the PD. As a results, the dynamic detection range of the PD's embedded inside the receiver must be large. Hence on one hand, the PD sensitivity must be high enough to be able to detect low optical power and the other hand the PD must be able to detect large amount of optical power required by the specifications of optical communication systems. Large optical power can drive the PD into saturation mode disabling its normal operation and degrading its performance. Hence, the PD's geometrical dimensions and thickness are designed carefully to meet the required PD performance.

The PDs which are embedded/integrated inside transceivers, should meet the communication system specifications with limitations for the AOP (Average Optical Power), OMA (Optical Modulation Amplitude), BER (Bit Error Rate), Bandwidth (BW) and other required parameters. To meet these specifications, PD design should yield low dark and high BW for a given range of AOP and OMA according to the communication system specification. However, when PD cannot meet the communication system requirement of minimum input optical power, they will yield poor (Signal to Noise Ratio) SNR and BER.

To achieve the specification requirements, PD fabricated for PICs in the SiP technology are designed with small diameters and thickness and thus suffer from low current saturation and can receive a limited amount of optical power before getting into saturation. Hence, receivers based on these PD will have limited dynamic range for the AOP and OMA and this may limit their SNR and BER. To solve this issue, the PD's geometrical diameters and or thickness could be increased however, this will yield low BW, large dark current and poor sensitivity, which may result in a poor SNR and BER.

In addition, it is well known that at high optical power the PD performance is affected by the space charge non-linear response carries which degrade the photo detector's high-frequency response, roll-off, and pulse narrowing.

To summarize, high bandwidth PD design for large input power is extremely challenging and requires a trade-off between PD responsivity, bandwidth and sensitivity according to the specific application they are designed for and there is increasing motivation to develop high bandwidth PD design which can operate at high optical power (AOP and OMA), meeting the optical receiver specification that considering the tradeoff between the PD responsivity maximum power, BW and sensitivity.

SUMMARY

There may be provided a silicon photonics unit that may include an input waveguide that is configured to convey an input optical signal; a distribution unit (DU) that may include a DU input port, a first DU output port, a second DU output port and a distribution core; wherein the distribution core is configured to receive the input optical signal, split the input optical signal to a first optical signal and a second optical signal, provide the first optical signal to the first DU output port and provide the second optical signal to the second DU output port; a photodetector (PD) that may include a PD's first optical input port, a PD's second input port, and an electrical PD output port; wherein the PD is configured to output, via the PD electrical output port, an output signal indicative of the first optical signal and the second optical signal; and a first optical path that may include a first waveguide and is configured to convey the first optical signal to the PD's first optical input port; and a PD's second optical path that may include a second waveguide and is configured to convey the second optical signal to the PD's second optical input port. The DU core may include a coupler, or may include a combination of a coupled and a switching unit.

There may be provided a silicon photonics unit that may include an input waveguide that is configured to convey an input optical signal; a distribution unit (DU) that may include a DU input port, a first DU output port, a second DU output port and a distribution core; wherein the distribution core is configured to receive the input optical signal and to apply one or more distribution operations on the input optical signal to provide at least one DU output signal to at least one DU output port of the first DU output port and the second DU output port; a photodetector (PD) that may include a PD's first optical input port, a PD's second output port, and at least one PD output port; wherein the PD is configured to output a PD signal indicative of at least one optical signal received by the PD; an first optical path that may include a first waveguide and is configured to convey a DU output signal outputted from the first DU output port to the PD's first optical input port; and an second optical path that may include a second waveguide and is configured to convey a DU output signal outputted from the second DU output port to the PD's second optical input port.

There may be provided a method for optical signal detecting, the method may include: conveying, by an input waveguide of a silicon photonics unit, an input optical signal; receiving the input optical signal, by a distribution unit (DU) of the silicon photonics unit, the input optical signal; splitting the input optical signal, by a distribution core of the DU, to a first optical signal and a second optical signal; conveying, by a first optical path that may include a first waveguide, the first optical signal to a photodetector's first (PD) optical input port; conveying, by a second optical path that may include a second waveguide, the second optical signal to a PD's second optical input port; and generating, by the PD, a PD output signal indicative of the first optical signal and the second optical signal.

There may be provided a method for optical signal detecting, the method may include conveying, by an input waveguide of a silicon photonics unit, an input optical signal; receiving the input optical signal, by a distribution unit (DU) of the silicon photonics unit, the input optical signal; applying, by the distribution core of the DU, one or more distribution operations on the input optical signal to provide at least one DU output signal; conveying, over at least one optical path of a first optical path and a second optical path, the at least one DU output signal to at least one optical input port of a PD; wherein the first optical path may include a first waveguide; wherein the second optical path may include a second waveguide; and generating, by the PD, a PD output signal indicative of the at least one DU output signal.

There may be provided a method for calibrating a silicon photonics unit, the method may include: preforming multiple calibration iterations; and reducing, based on outcomes of the multiple calibration iterations, a gap between (i) phase and/or amplitude characteristics of a first optical path of the silicon photonics unit and (ii) corresponding phase and/or amplitude characteristics of a second optical path of the silicon photonics unit; wherein the silicon photonics unit also may include: an input waveguide that is configured to convey an input optical signal; a distribution unit (DU) that may include a DU input port, a first DU output port, a second DU output port and a distribution core; wherein the distribution core is configured to receive the input optical signal, split the input optical signal to a first optical signal and a second optical signal, provide the first optical signal to the first DU output port and provide the second optical signal to the second DU output port; and a photodetector (PD) that may include a first optical input port, a second input port, and an electrical PD output port; wherein the PD is configured to output, via the PD output port, a PD output signal indicative of the first optical signal and the second optical signal; wherein the first optical path may include a first waveguide and is configured to convey the first optical signal to the PD's first optical input port; and wherein the second optical that may include a second waveguide and is configured to convey the second optical signal to the PD's second optical input port.

BRIEF DESCRIPTION OF THE DRAWINGS

FIGS. 24, 25 and 26 illustrate examples of methods.

DETAILED DESCRIPTION OF THE DRAWINGS

Figure 1:
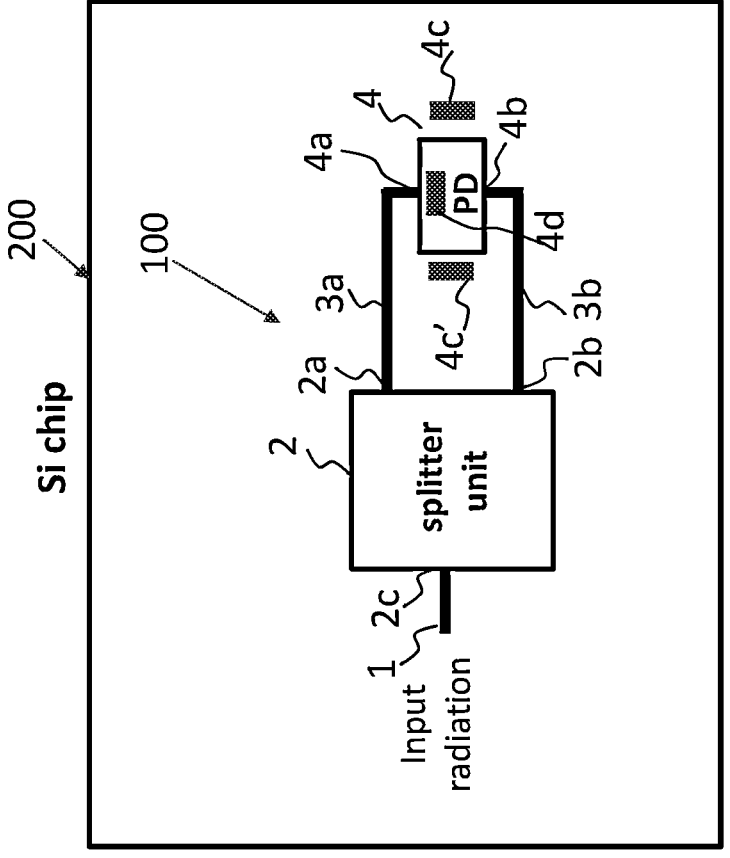
FIG. 1 is an example of a general schematics of the silicon photonics unit.

A detailed description of the related design is disclosed in the following parts.

In order to optimize the optical power absorbed by waveguide PD without degrading its speed (BW response), the waveguide PD diode geometrical architecture in the disclosed application and silicon photonics unit are design to be fully or at least partially decoupled from the optical design of the waveguides which feed the light into said waveguide PD. Furthermore, the disclosed PD design considers reduction of the space charge distribution of the electrons and holes photo carriers to enable the device to operate at higher optical power and high saturation current.

In the following detailed description, numerous specific details are set forth to provide a thorough understanding of the invention.

However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or silicon photonics unit capable of executing the method.

Any reference in the specification to a silicon photonics unit or device should be applied mutatis mutandis to a method that may be executed by the silicon photonics unit.

Any combination of any module or unit listed in any of the figures, any part of the specification and/or any claims may be provided.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

It has been found that a detection of an input optical signal is significantly improved if the input optical signal is split to two optical signals that are eventually fed to two sides (for example two opposite sides) of a detection region of the PD (for example a germanium region of the PD). In some case this may require that the two optical signals are received at the same time at the two sides of the PD.

There may be provided a silicon photonics unit that may include an input waveguide that may be configured to convey an input optical signal; a distribution unit (DU) that may include a DU input port, a first DU output port, a second DU output port and a distribution core; wherein the distribution core may be configured to receive the input optical signal, split the input optical signal to a first optical signal and a second optical signal, provide the first optical signal to the first DU output port and provide the second optical signal to the second DU output port; a photodetector (PD) that may include a PD's first optical input port, a PD's second input port, and a PD output port; wherein the PD may be configured to output, via the PD output port, a PD output signal indicative of the first optical signal and the second optical signal; and a first optical path that may include a first waveguide and may be configured to convey the first optical signal to the PD's first optical input port; and a second optical path that may include a second waveguide and may be configured to convey the second optical signal to the PD's second optical input port.

Figure 9:
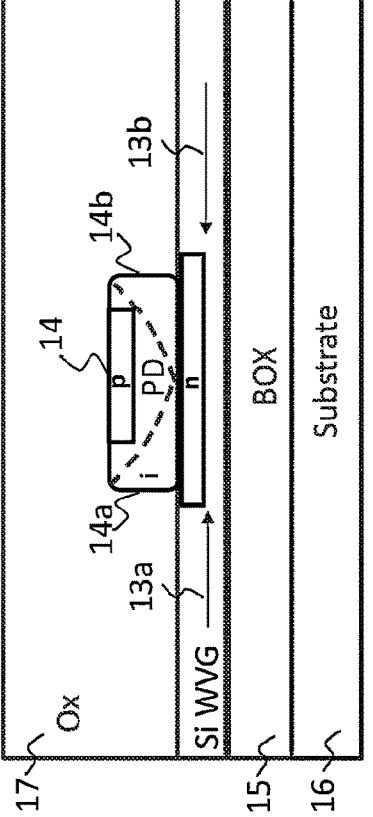

The PD may include a n-doped region, a p-doped region and an intrinsic detection region "i", as shown in FIG. 9, that may be positioned along a first virtual axis, between the n-doped region and the p-doped region; wherein the first optical signal and the second optical signal propagate towards the detection region, along a plane that may be oriented in relation to the first vertical axis by about ninety degrees; wherein the PD may be set in reverse bias.

The about ninety degrees ranges between sixty and one hundred and twenty degrees.

The silicon photonics unit may include one or more compensation elements that may be configured to compensate for at least one error related to the first optical signal and the second optical signal.

An error of the at least one error may be a DU splitting related error.

An error of the at least one error may be a mismatch between the first and second optical paths.

A compensating element of one or more compensation elements may be included in the PD.

The one or more compensating elements may be included in one or more optical paths of the first optical path and the second optical path.

A compensating element of the one or more compensating elements may be included in the PD and another a compensating element of the one or more compensating elements may be included an optical path of the first optical path and the second optical path.

The one or more compensation elements may include one or more delay units.

The one or more compensation elements may include one or more amplitude changing units.

The one or more compensation elements may be configured to maintain a requested split ratio between the first optical signal and the second optical signal and to eliminate a propagation delay between the first optical signal and the second optical signal.

The PD's first optical input port and the PD's second optical input port may be located at opposite sides of a detection region of the PD.

The detection region may be butt coupled.

The detection region may be evanescently coupled.

The PD may include two optical input ports wherein the PD's first and the second optical input port may be located at opposite sides of a detection region of the PD.

The PD may include a first electrical port and a second electrical port; wherein the first electrical port and the second electrical port may be located at other opposite sides of the detection region.

The DU may be a splitter.

The DU may be a MMI splitter.

The DU may be a directional coupler.

The DU may include a splitter and a switch.

The distribution core may be configured to nullify an optical signal of the first optical signal and the second optical signal.

The first optical path and the second optical path may be mutually symmetric about a symmetry axis.

The silicon photonics unit may include electrical conductors that may be arranged in a symmetrical manner in relation to the symmetry axis.

The PD may include a detection region.

The detection region may be butt coupled.

The detection region may be evanescently coupled.

The PD may include a first electrical port and a second electrical port; wherein the first electrical port and the second electrical port may be coupled to different sides of the detection region.

The silicon photonics unit may include a inductor that may be in communication with at least one electrical port of the first electrical port or the electrical port.

The silicon photonics unit may include a inductor and a trans impedance amplifier that may be in communication with at least one electrical port of the first electrical port or the second electrical port.

There may be provided a silicon photonics unit that may include an input waveguide that may be configured to convey an input optical signal; a distribution unit (DU) that may include a DU input port, a first DU output port, a second DU outport and a distribution core; wherein the distribution core may be configured to receive the input optical signal and to apply one or more distribution operations on the input optical signal to provide at least one DU output signal to at least one DU output port of the first DU output port and the second DU output port; a photodetector (PD) that may include a PD's first optical input port, a PD's second output port, and at least one electrical PD output port; wherein the PD may be configured to output a PD signal indicative of at least one optical signal received by the PD; an first optical path that may include a first waveguide and may be configured to convey a DU output signal outputted from the first DU output port to the PD's first optical input port; and an second optical path that may include a second waveguide and may be configured to convey a DU output signal outputted from the second DU output port to the PD's second optical input port.

The silicon photonics unit may include one or more compensation elements that may be configured to compensate for at least one error related to the first optical signal and the second optical signal.

There may be provided a method for optical signal detecting, the method may include conveying, by an input waveguide of a silicon photonics unit, an input optical signal; receiving the input optical signal, by a distribution unit (DU) of the silicon photonics unit, the input optical signal; splitting the input optical signal, by a distribution core of the DU, to a first optical signal and a second optical signal; conveying, by a first optical path that may include a first waveguide, the first optical signal to a first photodetector (PD) optical input port; conveying, by a second optical path that may include a second waveguide, the second optical signal to a second PD optical input port; and generating, by the PD, a PD output signal indicative of the first optical signal and the second optical signal.

There may be provided a method for optical signal detecting, the method may include conveying, by an input waveguide of a silicon photonics unit, an input optical signal; receiving the input optical signal, by a distribution unit (DU) of the silicon photonics unit, the input optical signal; applying, by the distribution core of the DU, one or more distribution operations on the input optical signal to provide at least one DU output signal; conveying, over at least one optical path of a first optical path and a second optical path, the at least one DU output signal to at least one photodetector (PD) optical input port of a PD; wherein the first optical path may include a first waveguide; wherein the second optical path may include a second waveguide; and generating, by the PD, a PD output signal indicative of the at least one DU output signal.

There may be provided a method for calibrating a silicon photonics unit, the method may include:

preforming multiple calibration iterations; and reducing, based on outcomes of the multiple calibration iterations, a gap between (i) phase and/or amplitude characteristics of a first optical path of the silicon photonics unit and (ii) corresponding phase and/or amplitude characteristics of a second optical path of the silicon photonics unit; wherein the silicon photonics unit also may include: an input waveguide that may be configured to convey an input optical signal; a distribution unit (DU) that may include a DU input port, a first DU output port, a second DU output port and a distribution core; wherein the distribution core may be configured to receive the input optical signal, split the input optical signal to a first optical signal and a second optical signal, provide the first optical signal to the first DU output port and provide the second optical signal to the second DU output port; and a photodetector (PD) that may include a PD's first optical input port, a PD's second input port, and an electrical PD output port; wherein the PD may be configured to output, via the PD electrical output port, a PD output signal indicative of the first optical signal and the second optical signal; wherein the first optical path may include a first waveguide and may be configured to convey the first optical signal to the PD's first optical input port; and wherein the second optical that may include a second waveguide and may be configured to convey the second optical signal to the PD's second optical input port.

There may be provided a silicon photonics unit and a method for a photo detector or a waveguide photodetector connected to a plurality of waveguide which guide the incoming optical signal to the photo detector.

In one embodiment, the Silicon chip, may be referred also as the Electrooptic chip, is fabricated from SOI wafers, wherein in the SOI wafer comprises the following stack layers structure:

i. A top Silicon layer;

ii. An insulator layer fabricated from Oxide layer (labeled as BOX layer);

iii. A bottom Silicon substrate;

The waveguide PD may be designed with at least two waveguide ports.

In a further embodiment, the PIC circuit comprises of the optical feeding waveguide architecture and PD, circuit can be fabricated on the Silicon chip. In another embodiment the corresponding PIC circuit can be fabricated on wafers based on Indium Phosphide, glass or any other III-V material or any combination of these materials.

In the corresponding photonic integrated circuit (PIC) may include a beam splitter device such a directional coupler an MMI or any other optical elements.

The corresponding beam splitter splits the incoming electro magnetic (EM) radiation from a main waveguide into a plurality of waveguides network/array which convey the incoming EM radiation into PD corresponding waveguide ports.

In one embodiment, the beam splitter could be based on a Directional Coupler, MMI, a "Y"-junction shape beam splitter, or any other optical device which can efferently split the incoming beam, or any combination thereof. In another embodiment, the splitter may be sensitive or non-sensitive to light polarization.

FIG. 1 illustrates a general schematics of an example of a silicon photonics unit 100. The silicon photonics unit is fabricated a Silicon or SOI chip 200 that includes an input waveguide 1, at least two waveguides 3a, 3b a splitter unit 2 and a PD 4. The beam splitter unit 2 is connected to main waveguide 1 along its input port 2c to the at least two waveguides 3a, 3b along its output ports 2a, 2b.

At least two waveguides 3a and 3b (refers as well in this application as two optical arms) are connected to their corresponding PD input ports 4a and 4b. The incoming EM radiation is coupled to the input waveguide 1 of the Silicon photonics unit 100. The radiation signal is coupled to the splitter unit 2 through its input port 2c and splits into two components which are coupled through its output ports 2a, 2b to at least two waveguides 3a and 3b. The waveguides 3a and 3b guide the EM radiation into the PD 4 through input ports 4a and 4b.

Figure 2:
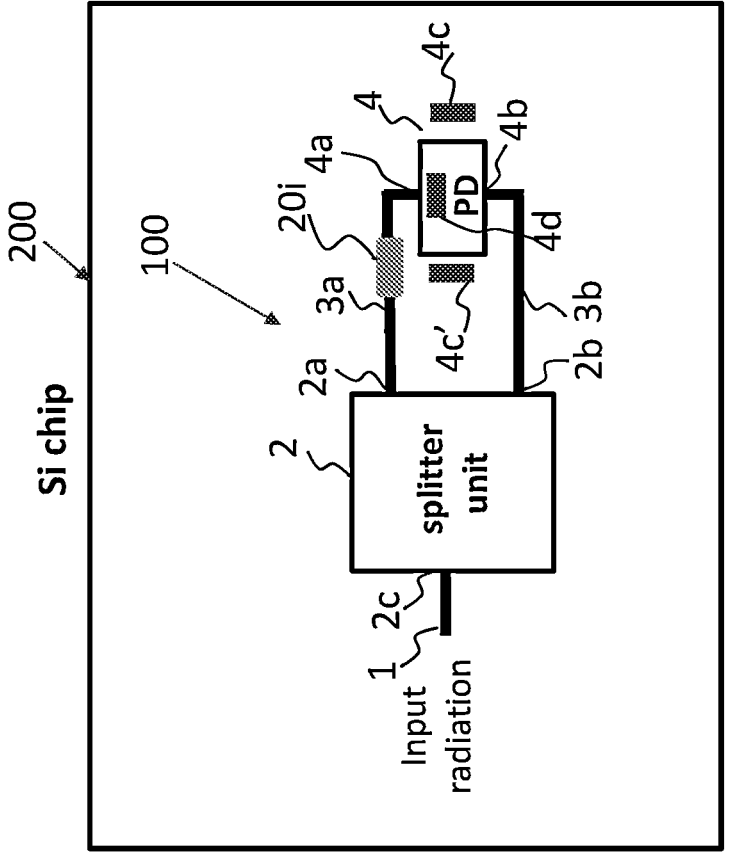
FIG. 2 is an example of a general schematics of the silicon photonics unit.

FIG. 2 differs from FIG. 1 by including a compensating element 20i.

In a yet further embodiment, the PD 4 is connected to electrical contacts (4d, 4c, 4c'), shown in FIGS. 1-8, 13, 15-16, 21 and 22. In the particular case of a PD 4 made of germanium material, the contact to the Si n-implant doping side (4c, 4c') and are on the same electrical potential and voltage bias where the contact to the Ge PD top side 4d which is connected to the positive carrier side p-doping side as shown in FIG. 9. The design of both Si and Ge contact have a state in the art design which in most cases they are fabricated mainly from metallic materials by a state of the art process. The electrical contact enable the electrical photocurrent generated by the PD to electrically flow through the attached DC and RF lines (not shown in some figures) further transmitting the electrical current signal generated by the PD as a results of the related incident optical signal. In its detection mode the applied voltage applied on the PD PN diode is in a reverse bias state.

Figure 21:
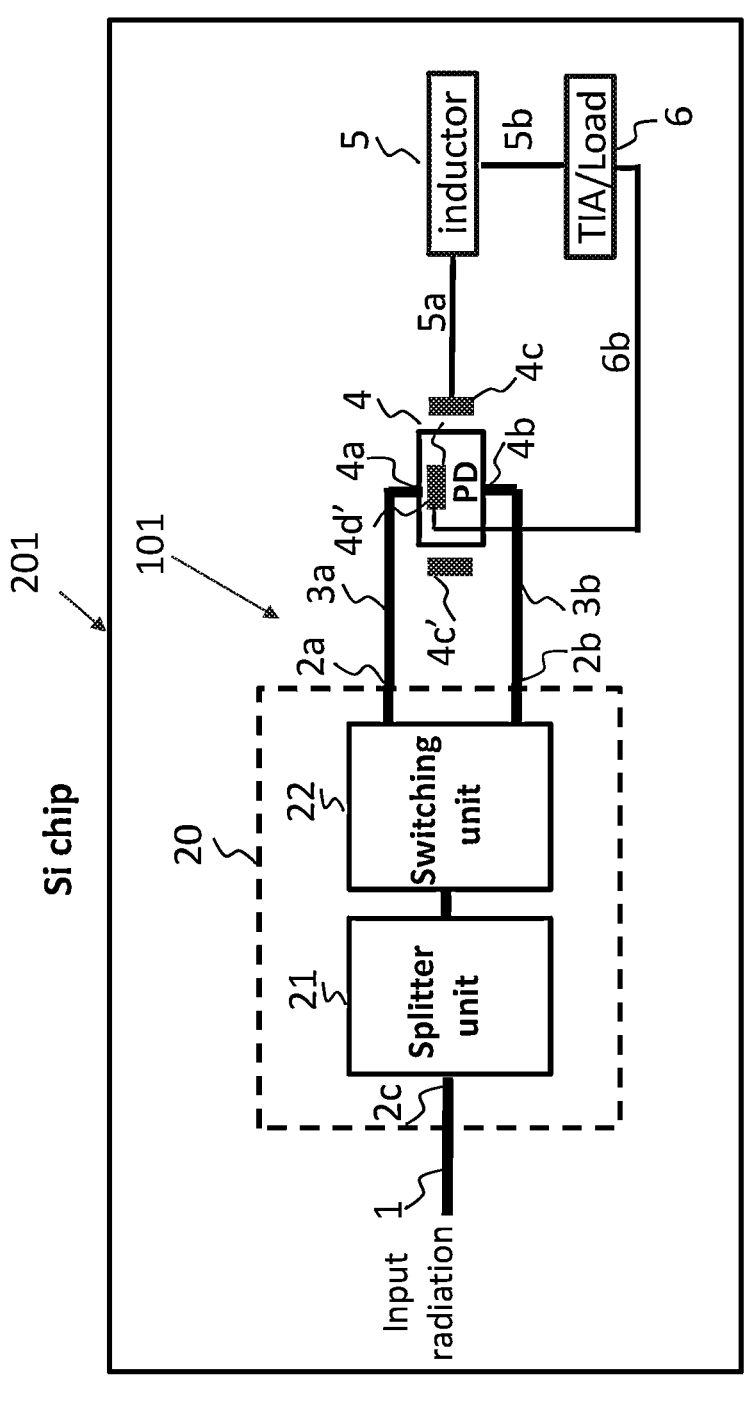
FIGS. 21 and 22 illustrates example of the silicon photonics unit connected to a receiver electrical circuit.
Figure 22:
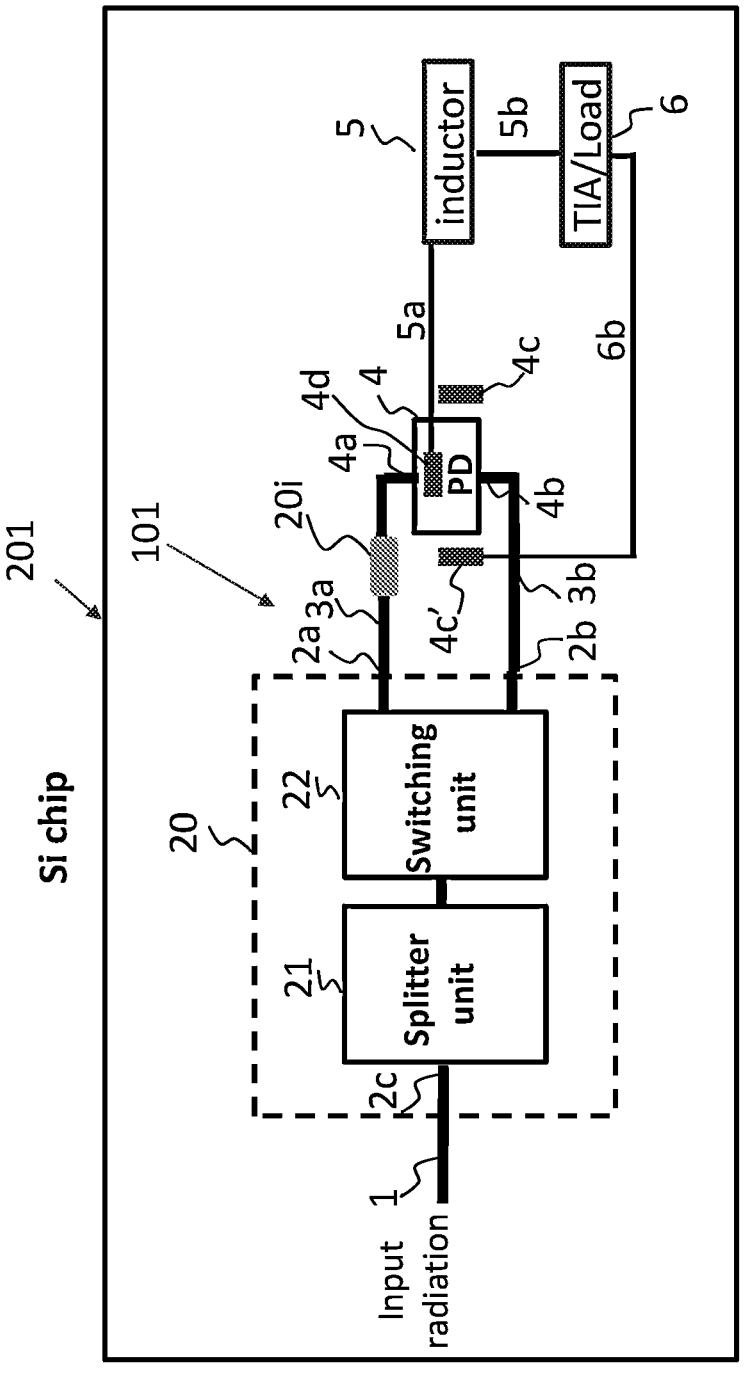

An example of the DC and or RF lines which are shown in FIGS. 21-22 (marked as 5a, 5b and 6b). In most cases the PD electrical current signal is then converted into a voltage signal by a Trans Impedance Amplifier (TIA) which is connected to a further supporting electrical circuit and then is decoded into a data signal by an Analog to Digital (A/D) converters and further decoded by a Digital Signal Processors system (DSP) of the receiver unit (not showing in the figures).

Figure 3:
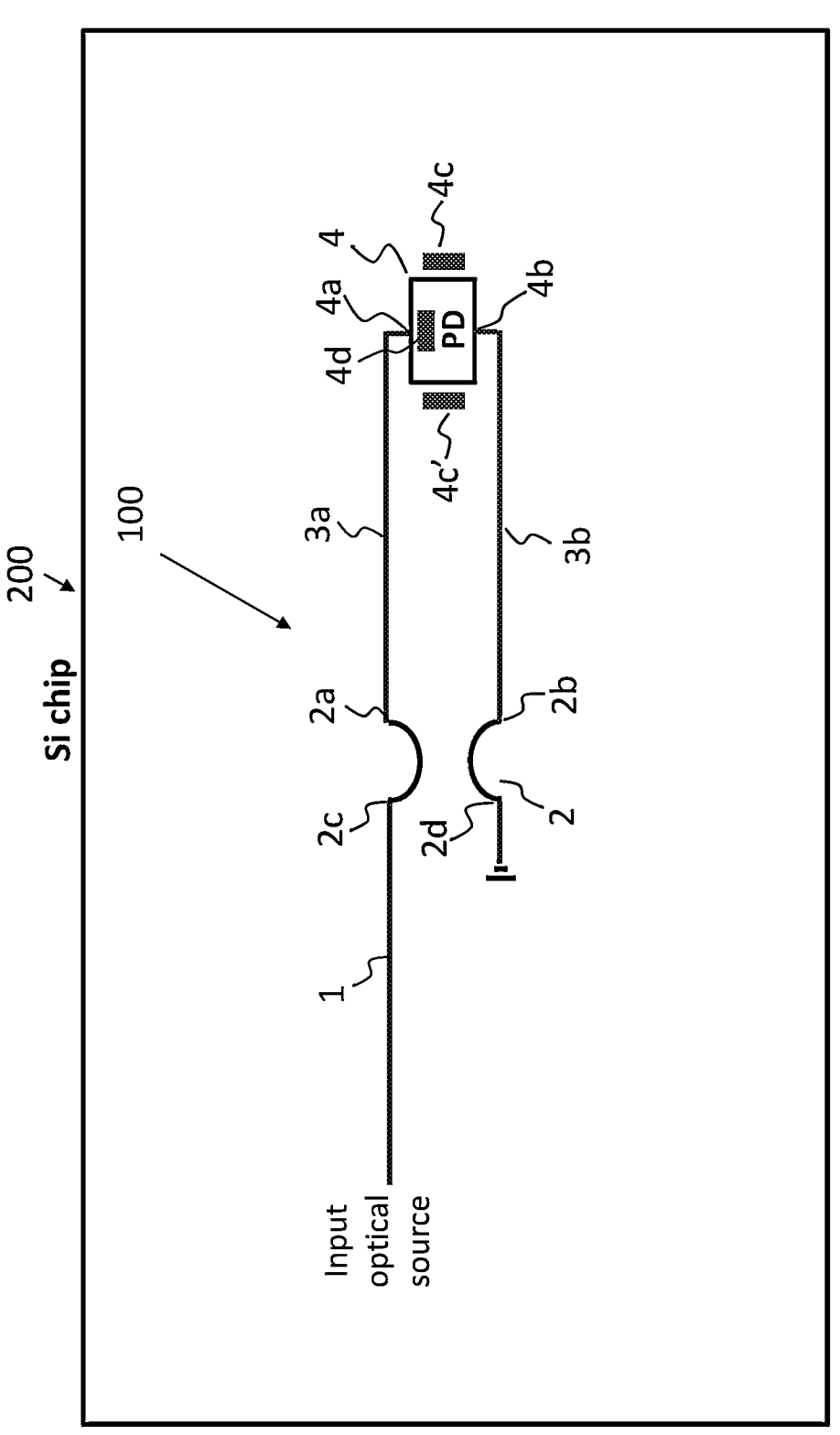
FIG. 3 is an example of a schematics of the silicon photonics unit which utilize a directional coupler (DC) as an optical splitter.

FIG. 3 illustrate an example of silicon photonics unit. This design is similar to that disclosed at FIG. 1, however utilize a 50/50, 2×2 Directional Coupler (DC) 2 as an optical splitter. The splitter unit is designed with two input port connected to waveguide ports 2c and 2d where the optical signal is launched from the input waveguide 1 to the DC coupler's input waveguide 2c and is evenly split to its output waveguide ports 2a, 2b.

In this case the input waveguide 2d is connected to an optical load which eliminate or at least significantly reduces the back reflection from that port to all other directional coupler ports (2a, 2b 2c).

Figure 4:
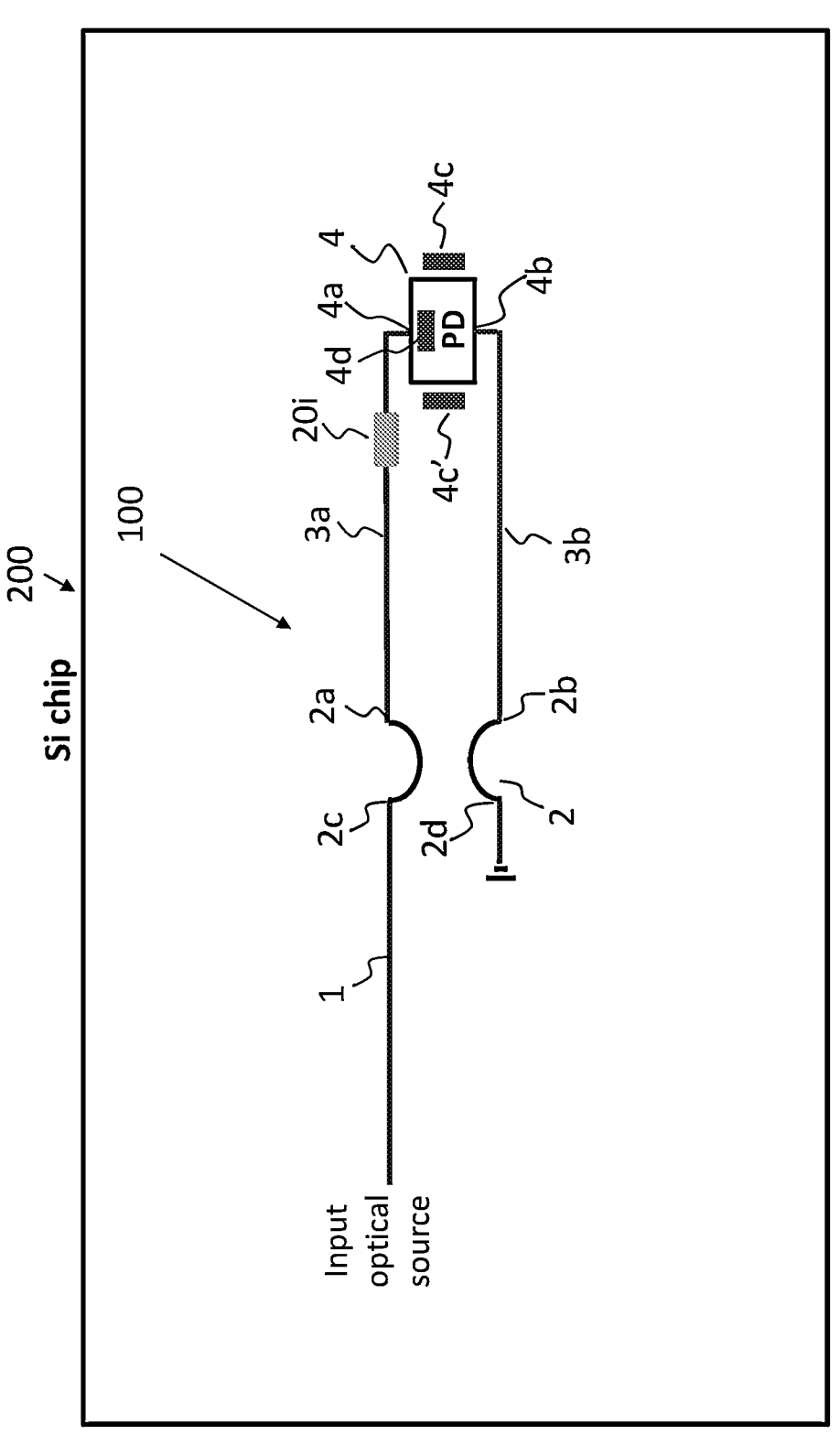
FIG. 4 is an example of a schematics of the silicon photonics unit which utilize a directional coupler (DC) as an optical splitter.

FIG. 4 differs from FIG. 3 by including a compensating element 20i wherein this the compensation and delay element/devices, which can be fabricated on the PIC. Such devices can phase shifts or optical attenuators based Heaters devices made of metals or dopped Si, Si PIN devices operate at revers and forward bias etc.

The compensating element 20i can be fabricated from exotic material such as lithium Niobate or Indium Phosphide, Gallium Arsenide, Graphene or any combination thereof which can be integrated on the PIC by any deposition method, or by any bonding method.

A compensating element 20i can be controlled by an external voltage and set to some attenuation or phase shifts values.

Any reference to a single compensating element may be applied mutatis mutandis to multiple compensating elements that may be arranged in any manner-serial, parallel, or a combination thereof. The multiple compensating elements may be independently controlled—or at least some of the compensating elements may be controlled together. Different compensating elements may control different aspects-phase or intensity or both.

Figure 5:
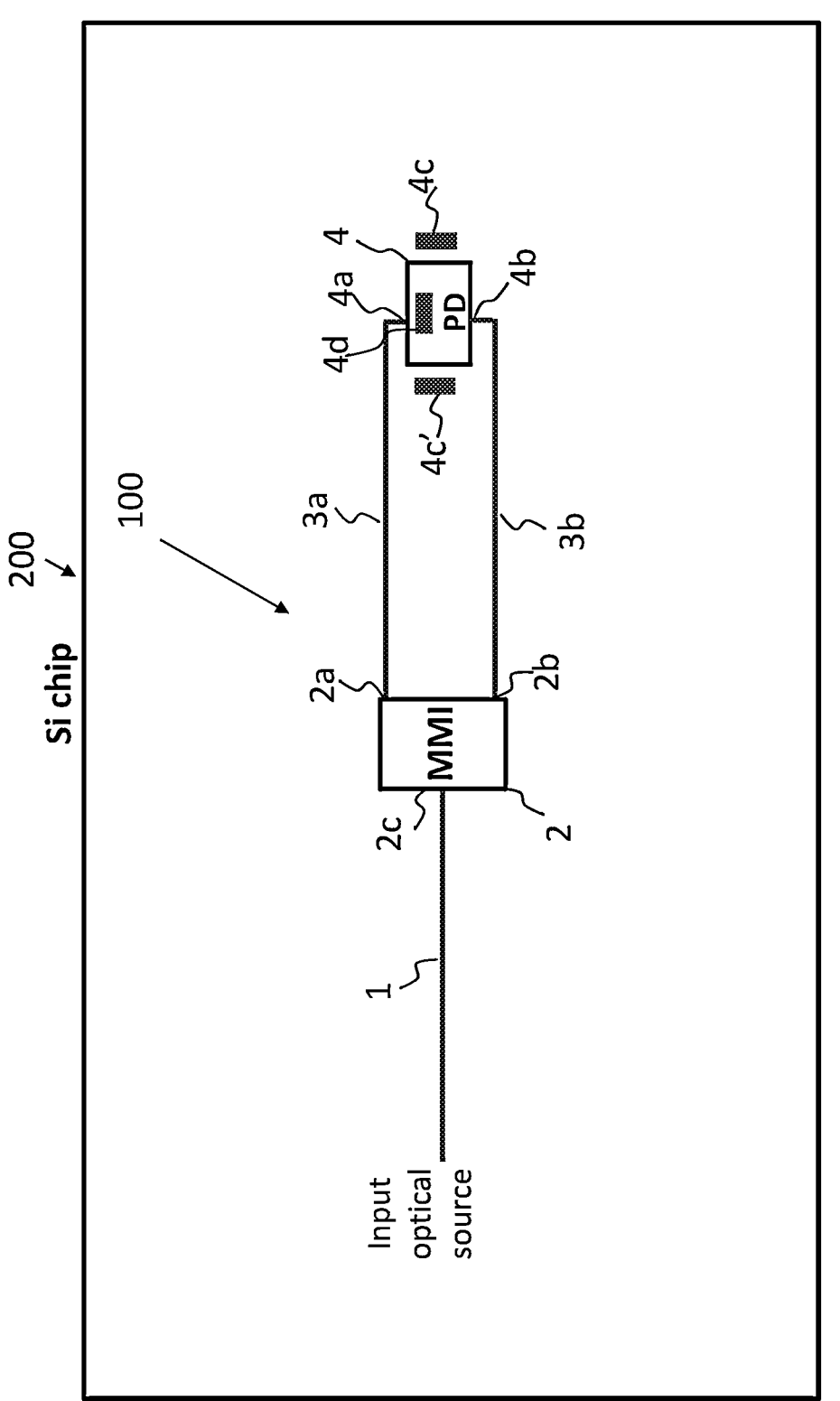
FIG. 5 is an example of a schematics of the silicon photonics unit that utilizes a Multi-Mode Interferometer (MMI) coupler as an optical splitter.

FIG. 5 illustrates another example of a silicon photonics unit utilizes a Multi-Mode Interferometer (MMI) coupler 2 as an optical splitter. The splitter unit is designed with one waveguide port 2c where the optical signal is launched from the input waveguide 1 to the DC input waveguide 2c and is evenly split into its output ports 2a, 2b.

Figure 6:
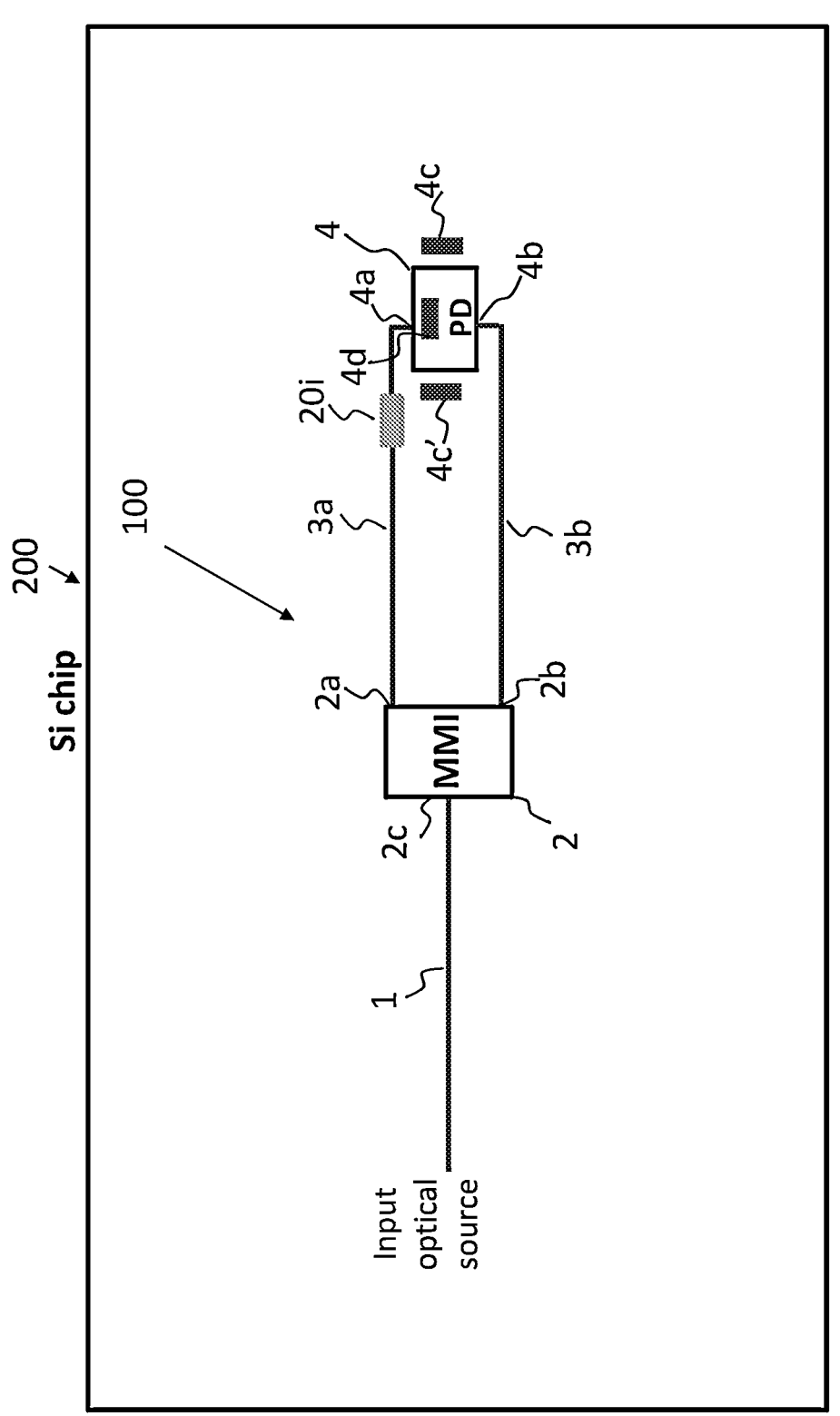
FIG. 6 is an example of a schematics of the silicon photonics unit that utilizes a Multi-Mode Interferometer (MMI) coupler as an optical splitter.

FIG. 6 differs from FIG. 5 by including a compensating element 20i.

Figure 7:
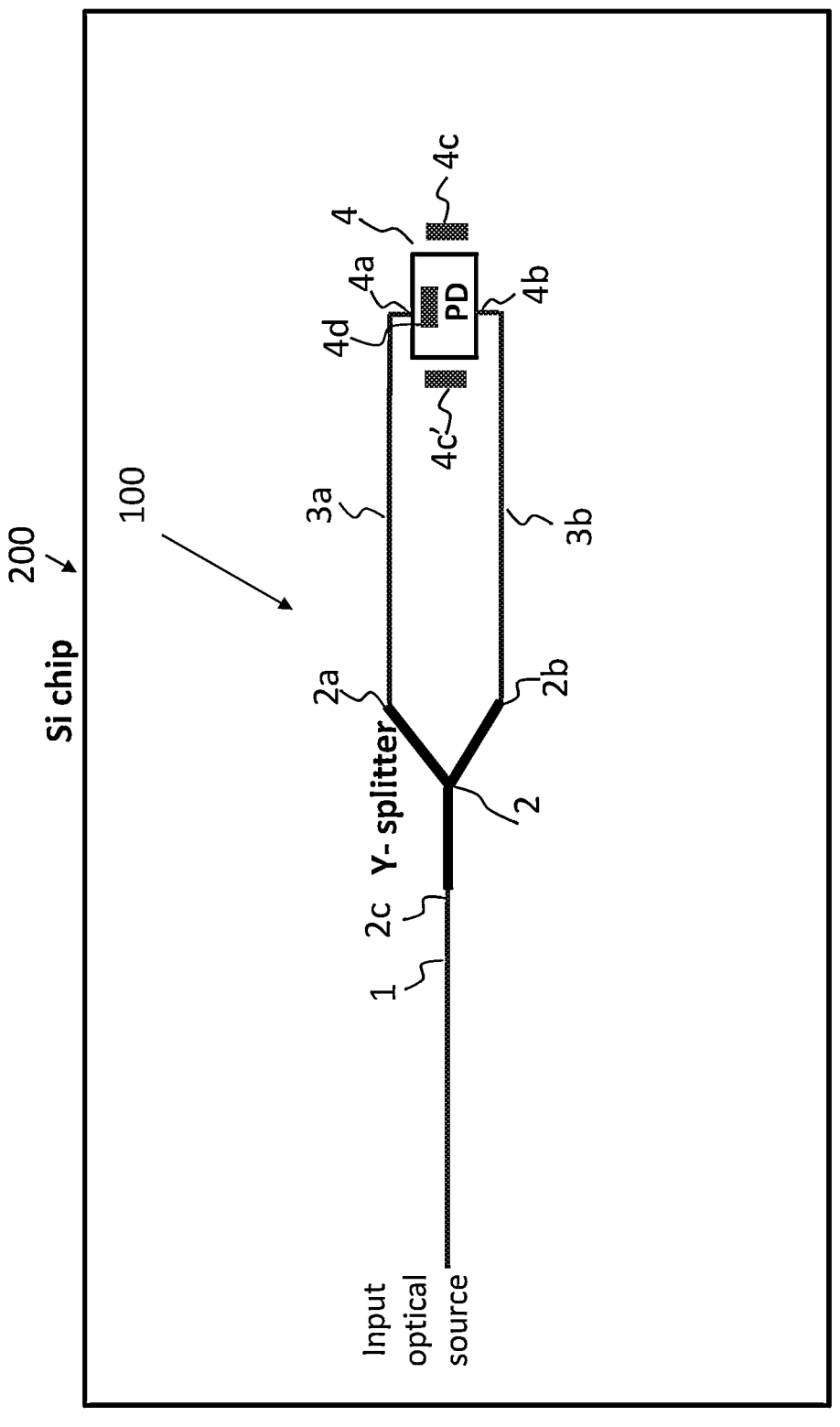
FIG. 7 is an example of a schematics of the silicon photonics unit that utilizes a "Y"-shape splitter as an optical splitter.

FIG. 7 illustrate an example of a schematics of the silicon photonics unit. In this case This design is also similar to that disclosed at FIG. 1, however utilizes a "Y"-shape splitter as an optical splitter. In this case, the splitter unit 2 is designed with one waveguide port 2c where the optical signal is launched from the input waveguide 1 to the "Y" shape coupler's input waveguide port 2c and is evenly split to its output ports 2a, 2b.

The splitter of unit 2 may be designed by a Silicon Photonic 50/50 optical power beam splitter.

Figure 8:
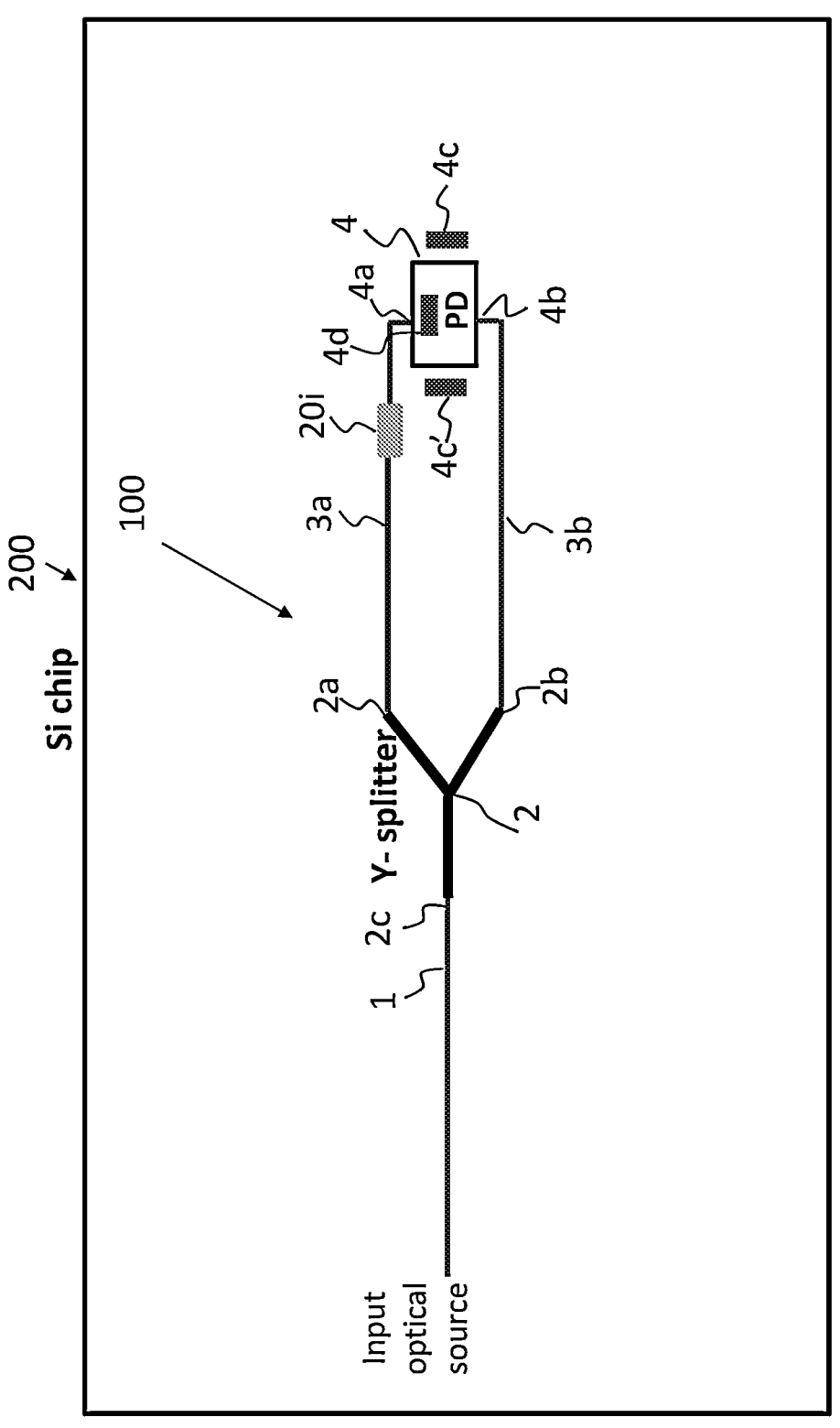
FIG. 8 is an example of a schematics of the silicon photonics unit that utilizes a "Y"-shape splitter as an optical splitter.

FIG. 8 differs from FIG. 7 by including a compensating element 20i.

In a yet further embodiment, all PIC's 100 metallic elements, such as PD metallic contacts shown in FIGS. 1-8, 11,13, 15-16, 21-22, (4c, 4c', 4d) and 23a and b (405c, 405c', 405d), metallic DC and RF lines, metallic dummies that are added near the PIC's elements, are distributed in a symmetrical configuration with respect these PIC's optical and electro optical devices, wherein the PIC's elements refers to optical waveguides 3a and 3b, optical beam splitter and PD device (The metallic dummies are metallic squares which are added to si contacts is None active silicone area in order to create a uniform distribution of contact etching mask for further uniformities means of the further etching polishing and other required process processes).

In another embodiment, it is also recommended that the later metallic elements will not be located far enough from the PIC's elements such optical waveguides, beam splitter and PD devices, or at least will be placed far enough from these elements. This is done in order to reduce optical loss of the propagating optical beam/signal due to its electromagnetic interaction with PIC's metallic elements however also to equalize the optical loss and optical phase shift introduced by the PIC's metallic elements on the split beam propagation in the two optical arms 3a and 3b. Another main reason is that an asymmetrical distribution of the PIC's optical elements may result in uneven optical loss or optical phase shift converted into optical difference between the two split propagating beams. This effect may distort or add undesired artifact to the modulated data of the optical carrier.

Example of a symmetric contacts design marked as 4c, 4c' and 4d is shown in FIG. 1.

Figure 10:
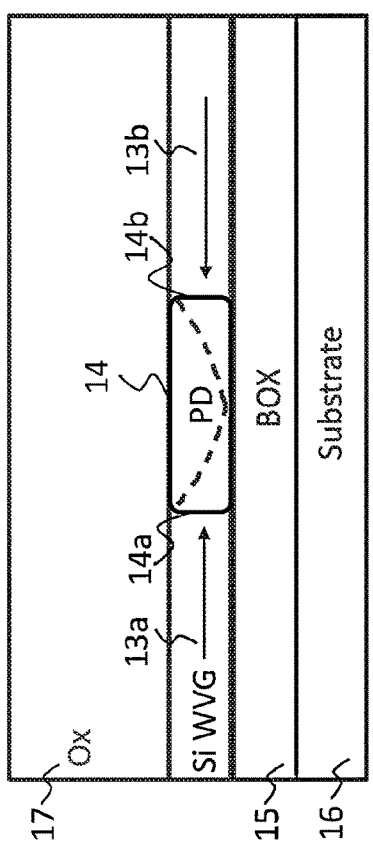
FIGS. 9 and 10 illustrate cross-sections of a layer structure architecture for evanescent coupling (FIG. 9) and butt coupling (FIG. 10) photodetectors, fabricated on SOI (Silicon On Insulator) wafers.

FIGS. 9 and 10 illustrate a cross-sectional of the layer structure architecture for evanescent coupling (FIG. 9) and butt coupling (FIG. 10) photodetectors, fabricated on SOI wafers in two particular embodiments of the present invention. The SOI wafer layer structures comprises of a Substrate layer 16, a Buried Oxide layer BOX 15, a Silicon waveguide layer 13, an Oxide cladding layer 17 and a Germanium PD layer 14. In the illustrated design, the germanium PD 14 is fed along its two sides 14a and 14b by two waveguides 13a, 13b which carry and direct the incoming optical signal through the waveguide PD interfaces 14a and 14b, respectively, onto the waveguide PD absorbing layer 14. The dashed line in FIGS. 9 and 10 illustrate the distribution of absorbed optical power along the PD absorbing layer at the PD-WVG direction for evanescent coupling (FIG. 9) and butt coupling (FIG. 10) photodetectors wherein this absorbed optical power is converted into excitation of corresponding electron, n, and holes, p, distributions along the waveguide photodetector (PD-WVG) corresponding direction. As a results, for a given input optical power, the uniformity of the electron and holes distribution along the waveguide photo detector area is significantly improved with respect to a conventional waveguide photo detector which is fed by a single waveguide port. Thus, per a given optical input power, the space charge screening effect of the electron and holes space charge on the diode bias voltage is reduced enabling the device to operate with a larger responsivity per given optical power and or at high optical power with a higher saturation current and at a higher speed. Hence, the presented device of the present invention benefits from a larger responsivity and higher saturation current which enable the disclosed waveguide photodetector silicon photonics unit and application to operate properly at higher input optical power.

Practically, for a PD which is fed along its two sides by two optical wave guide (See example at FIGS. 1-8) thereby distributing half of the optical input power from each waveguide over the detector area which is equivalent to a distribution of the optical power over an affective area that is twice longer with respect to PD geometrical area. This may result in almost doubling of the saturation current enabling the specific designed PD to receive and read almost a double of optical power without getting into saturation stage while maintaining the same BW.

Alternatively, with this design it is possible to reduce the PD area thus increase its corresponding BW. Hence, the disclosed design enables a PD with better responsivity, bandwidth, sensitivity, leakage current, bias voltage and saturation current than a PD with single input.

In what follows we disclose a particular embodiment of the present invention which is designed to improve the Silicon photonics unit 100 performance, wherein the design of the PD 4 coupled to a plurality of waveguide ports and a plurality of optical feeding arms are designed in such an architecture in which the waveguide PD diode geometrical architecture is fully or at least partially decoupled from the optical feeding arms/waveguides which feed the light into said waveguide PD. Wherein in the related design the light direction is fully or partially vertical with respect to the PD PN diode direction (P/N stand for the diode positive/Negative carrier doping implants).

Figures 11, 12:
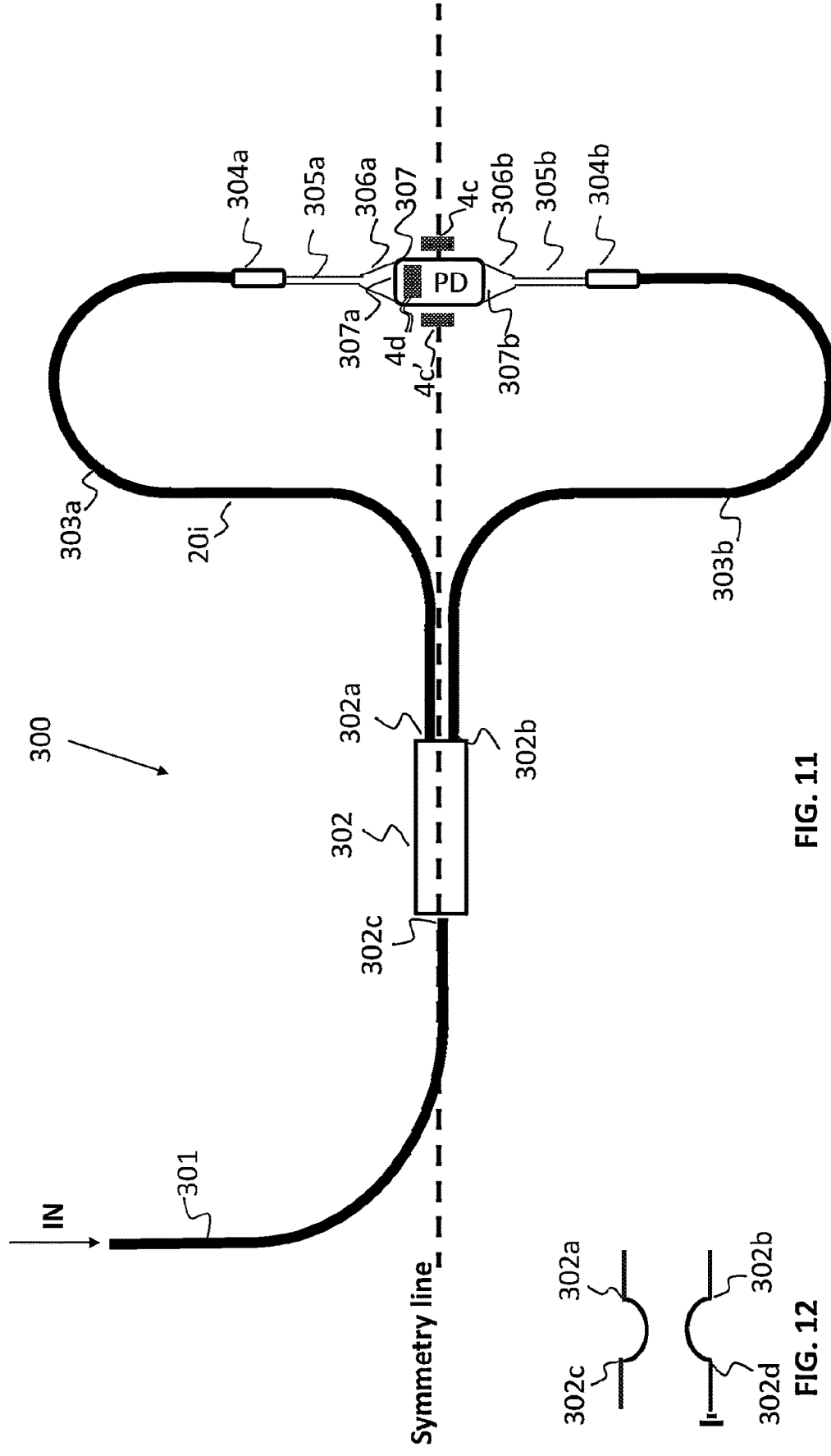
FIGS. 11 and 12 are examples for evanescent and butt coupling architecture of dual feeding waveguide photo detectors.
Figures 13, 14:
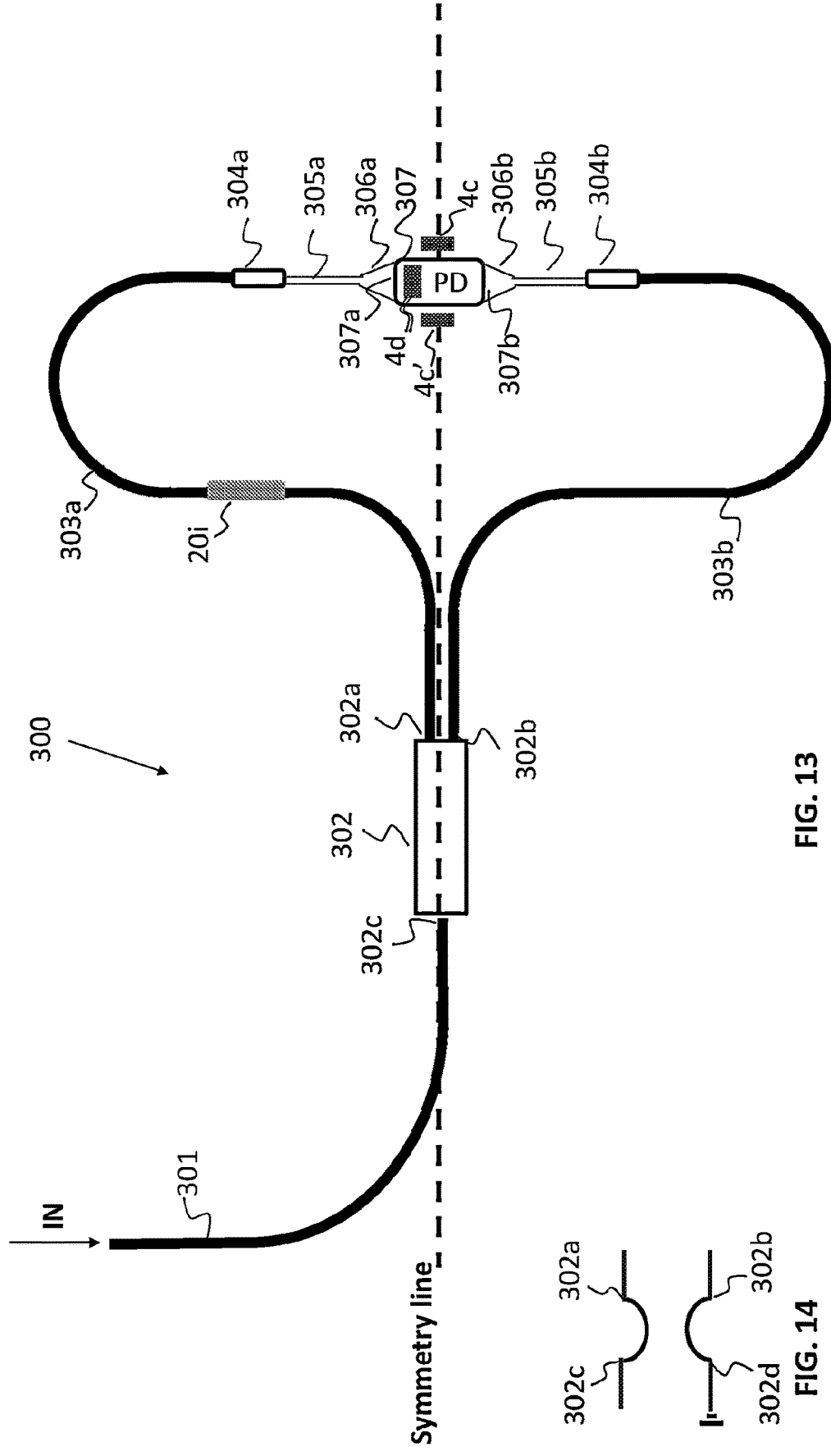
FIGS. 13, 14, 15 and 16 are examples of the silicon photonics unit.

An example of such geometrical architecture is given at FIGS. 11 and 12. FIGS. 13 and 14 differ from FIGS. 11 and 12 respectively by having a compensation unit.

FIGS. 9 and 10 are examples for evanescent or butt coupling design architecture for a dual feeding waveguide photo detectors in particular embodiment of the present invention.

These devices are designed and fabricated on SOI wafers as shown at FIGS. 9 and 10.

In this design, the PD Silicon photonics unit 300 has dual feeding waveguide photo detectors and fabricated on the SOI wafer. The corresponding layer structure for an evanescent and a butt coupling from a Si waveguide to a waveguide PD are shown in FIGS. 9 and 10, respectively. In the related architectures, the incoming light from the Si taper waveguide 306a, 306b to the waveguide PD 307 through its related ports 307a and 307b input ports, respectively The following design main components comprises a feeding waveguide composed of a plurality of waveguiding segments, an MMI beam splitter 302 and a germanium based waveguide photo detector 307.

The waveguiding part comprises three low loss silicon nitride waveguide segments 301, 303a and 303b, a silicon nitride waveguide to silicon waveguide couplers 304a and 304b, two silicon waveguides 305c and 305b and two silicon taper waveguide 306a and 306b.

The incoming light beam is coupled into the input of the PD optical circuit 300 through a low loss silicon nitride waveguide 301 and is coupled to the 1×2 MMI splitter device 302, through its input port 302c. The light beam and is split into two light beam components with equal optical power through the MMIs' output ports 302a and 302b. each of the two split light beams further propagates trough low loss curved silicon nitride waveguides segments 303a and 303b, respectively, till reaching the proximity of the PD device 307, further reaching the two silicon nitride to silicone waveguide couplers 304c and 304b, which couple each of the split beam components to silicon waveguide 305a and 305b, respectively. The last propagation segment guides the two beams through silicon tapers waveguides

306a and 306b to the waveguide PD ports 307a and b, respectively, further couples to the PD 307 through an evanescent or a butt coupling physical mechanism. The silicon tapers waveguides 306a and 306b designed to modify the size of the beam (mode) to approximately match the diameter waveguide photo detector ports 307a and b along the horizontal direction of the propagating beam at both sides of the PD 307.

In this design the two split beams propagate equal optical distance.

In addition, this architecture keeps a symmetrical designed with respect the waveguide PD (see marked the symmetry dashed-line, so that the two optical arms that start from MMI output ports 302a and 302b and end at PD input ports 307a and 307b, respectively, have an equal optical path, thereby eliminating any relative phase difference between two parts of the propagating beam.

In a further embodiment, the MMI 302 can be replaced by a 1×2 50/50 directional coupler, shown at FIG. 14, or any other optical splitting device. The 50/50 directional coupler splitter unit is designed with two input port connected to waveguide ports 302c and 302d where the optical signal is launched from the input silicon nitride waveguide 301 to the DC coupler's input waveguide 302c and is evenly split to its output waveguide ports 302a, 302b. In this case the input waveguide 302d is connected to an optical load which eliminate or at least significantly reduces the back reflection from that port to all other directional coupler ports (302a, 302b 302c).

In a further embodiment, the optical phase difference between the two arms is significantly lower than the phase modulation of the modulated data signal.

In this case, all PIC elements on the electro optical chip/Silicon chip, comprises a waveguiding structures made of silicon, silicon nitride, oxide, oxynitride and any combination thereof. The PIC's elements are referred to couplers, grating couplers, beam splitter, waveguide PD, couplers between different type of elements, tapers inverted tapers and all other optional PIC components.

In a further embodiment, the PD can be fed by a plurality of waveguide ports where all splitting devices couplers are modified accordingly.

The direction of incoming light beam path may be perpendicular or parallel to the PD diode direction.

The PIC of the silicon photonics unit may be fabricated on SOI wafer.

A Germanium based photodetector may be fabricated from Germanium or Silicon Germanium material or any other absorbing material at wavelength range of 800-1600 nm the input optical carrier signal at wavelength range 800-1600 nm (examples of wavelength which are used for optical communication systems are: 850 nm, 1310 nm and 1550 nm).

The PIC may be fabricated on Indium Phosphide wafers where the waveguide PD is fabricated from III-V material which can monotonically fabricated on Indium Phosphide wafers.

The wafers where the waveguide PD is may be fabricated from III-V material which can monotonically fabricated on Indium Phosphide wafers.

The silicon photonics unit of the present invention may be integrated inside a receiver device with a plurality of channels wherein each receiver channel comprising at least one silicon photonics unit.

The PD Calibration Method

In what follows we disclose a method and a procedure for calibrating a PD with at least two optical arms, wherein the optical signal is used for matching the AC pattern on both sides of the photodetector. The Motivation in this case is to detect the DC and fast optical signal (AC) at the photodetector inputs 4a and 4b as shown at FIGS. 1 and 2, wherein in this case the amplitude and phase (delay) of the corresponding optical signal must be the same. However, due to inherent manufacturing tolerances and various error it is impossible to split the light perfectly between the two-inputs and make sure that the difference in phase of the two incoming signal is the same. The delay and/or amplitude in the signal of the inputs can severely impact the detected signal, wherein in the particular case of a binary data signal modulated on an optical carrier, two utility of a plurality of arms connected to a single PD, may yield in higher encoding errors of the modulated data signal and a higher BER.

Figure 15:
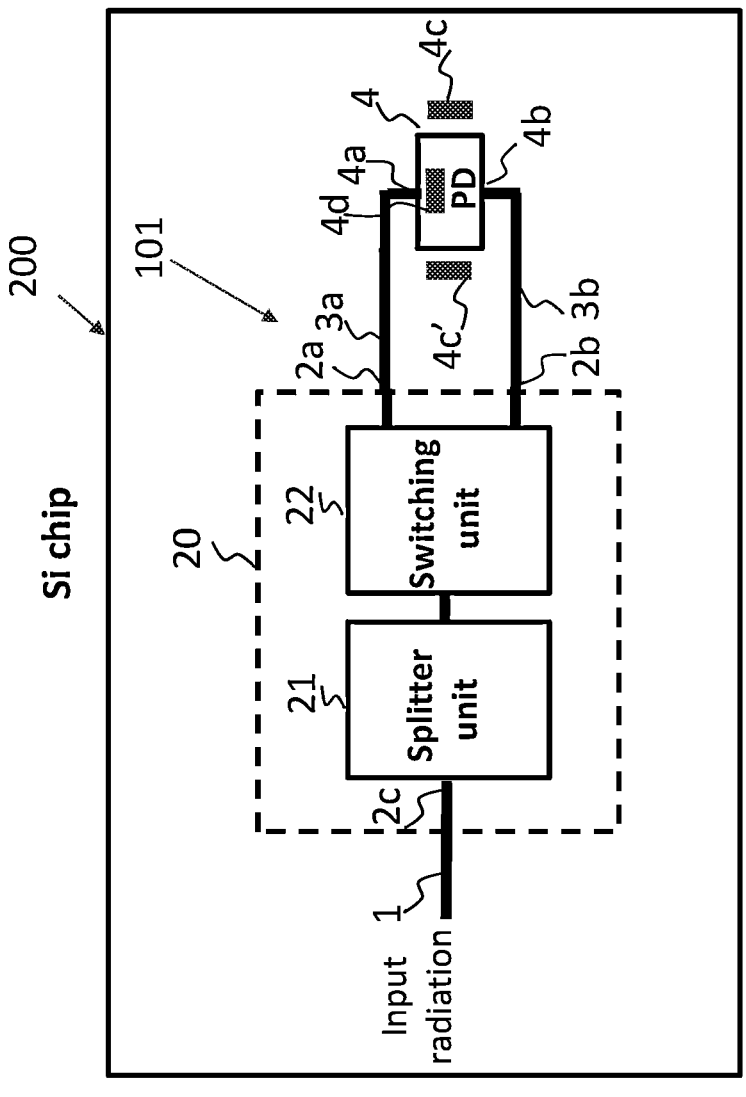
Figure 16:
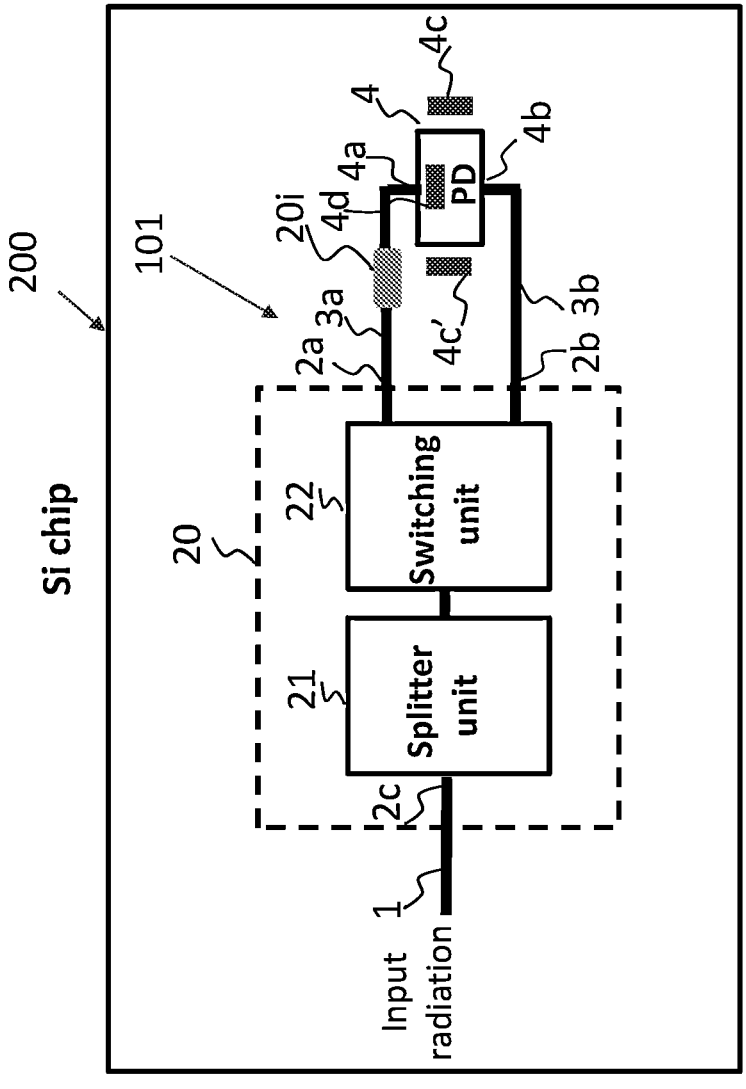

FIG. 15 illustrates a schematics diagram of a Silicon photonics unit 101 which is designed to enable a calibration of optical arms (3a, 3b) which operate as the optical feeding lines for the attached PD 4. The Silicon photonics unit 101 that is fabricated on a Silicon or SOI chip 200 is similar to the Silicon photonics units 100, however in this case the splitter unit 2 is being replaced by a splitting and a switching system 20, comprises of a splitter unit 21 and a switching unit 22. In this design the incoming optical signal (marked as well as the input radiation) propagates trough one input waveguide 1 and into the waveguide port 2c of the switching and splitting device 20. The optical signal is further transmitted through the attached splitter device 21 into two optical signal components which are further directed by a switching unit 22 to at least one of the optical arms (3a, 3b) which are connected to the PD 4, further enabling to measure separately the magnitude and a related phase/delay of each one of that optical arm. FIG. 16 differs from FIG. 15 by including a compensating element 20i.

In a one embodiment, the optical splitting and switching device 20 is designed with a splitter unit which also have an optical switching functionality. In another embodiment the splitting and optical switching device 20 comprises two separated units of a splitting unit 21 and a switching 22 unit. In yet still another embodiment, the switching and splitting device 20 comprises of an optical switching unit 21.

In a further embodiment, a calibration procedure is introduced in order to correct the phase delay and optical loss of each optical arm which are attached to the transmitted through at least two optical arms (3a, 3b) attached to PD 4. In that design, the PIC 101 has been designed to be tuned into a certain state which can compensate the different phase shift and optical loss of the optical signal which is transmitted through one of its optical arms (3a, 3b).

In a yet further embodiment, the optical signal passes a set of calibration tests which are associated with one or several parameters such as: Optical DC and AC measurements of the received signal through PD 4. In yet further embodiment, AC parameters could include optical modulation magnitude, extinction ratio, OMA (Optical Modulation Amplitude) BER, TDECQ (Transmitter and Dispersion Eye Closure Quaternary") and other parameters that define a time-domain signal.

At the next step the splitting and switching system enable to adjust magnitude and phase/delay of the propagating optical signal at that optical arm (3a, 3b) compensating the imperfections of the two received signal.

In a yet further embodiment, said optical switching device can modify the magnitude and phase of each of the incoming optical signal which propagate through said corresponding optical arm, where in this can be particularly applied on the incoming optical calibration signal.

In a yet further embodiment, the calibration signal is compared to a reference PD device which is connected to single optical arm.

In a yet further embodiment, the transmission magnitude and phase/delay results are compared to a reference PD or to a simulated reference PD, which is connected to a single optical arm.

In a yet further embodiment, post the calibration step, the magnitude and phase of each optical arm is modified to achieve an optimal signal which is similar to the signal received by a reference PD.

Figure 18:
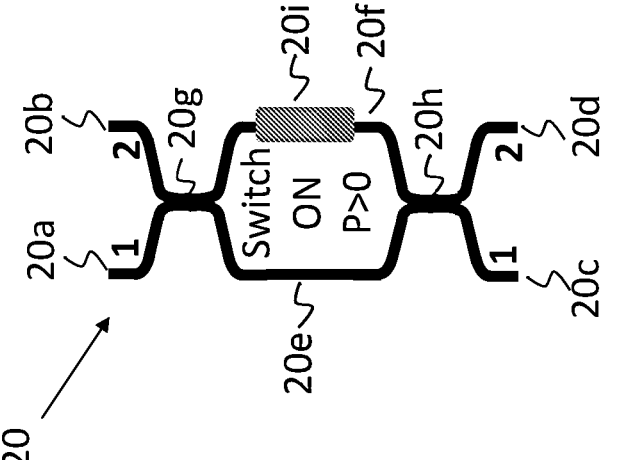
FIGS. 17 and 18 are examples of a splitting and switching optical device.
Figure 17:
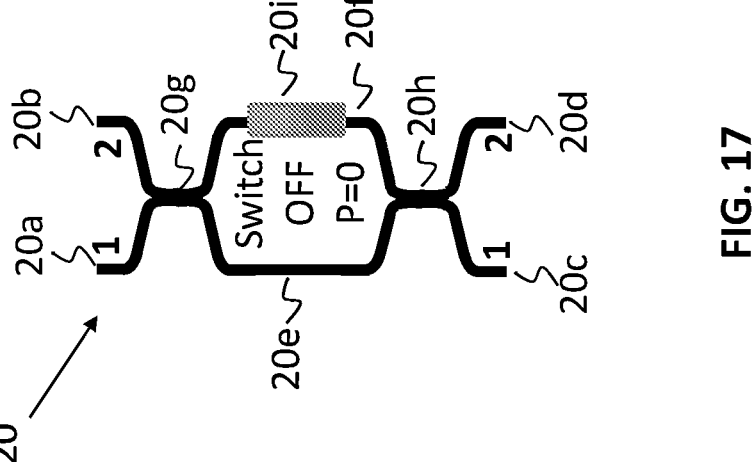

FIGS. 17 and 18 show a splitting and switching device 20 in one embodiment of the present invention. In the related design, the splitting and switching device 20 composed of two input waveguide ports (20a, 20b), marked also as input port 1 and 2, and two outputs waveguide port (20c, 20d), marked also as output port 1 and 2, an input and an output MMI devices (20g,20h), two waveguides (20e, 20f) connected to the input and output MMI devices (20g,20h) and a phase delay element 20i. In this design, the input signal is transmitted through one of the input waveguide ports, 20a or 20b, and then is evenly split by the input MMI 20g, further propagating trough the two waveguide segments (20e,20f). The phase delay element 20i modify the phase of optical signal component which propagate trough corresponding attached waveguide 20f with respect to the one which propagate trough the waveguide 20e. The two optical signals are further transmitted through the output MMI devices 20h input ports with a different phase and are transmitted out through the MMI output ports 20c and 20d with a different magnitude which depends on their relative phase. The magnitudes of the optical signals at the MMI output ports 20c and 20d is determined by the relative phase between the two optical signals which propagate through the waveguide segments 20e and 20c. As an example, when input waveguide port 20a carry the optical signal and port 20b is terminated, then a relative phase of zero degrees between arms result in signal output at 20d only. In the case of relative phase of 180 degree, output signal is divided between both outputs equally.

In another embodiment, the input and output of the MMI are replaced by a directional coupler device. In that design, the directional coupler is based on evanescently coupled the light from one waveguide to an adjacent one where in MMI design it is based on allowing for the single mode to evolve into a higher order mode and we place the outputs per splitting requirements (Figures of directional coupler and MMI)

In a further embodiment, said MMI interferometer device enable: i. To passively split and combine the optical signal and in order to actively control the phase and amplitude of the signal, compensating for the signal optical Loss and optical phase variation.

In another embodiment, the phase of the light can be actively modified by controlling the refractive index of light inside one of the MMI/MZI waveguides. In a yet further embodiment, the phase and magnitude of the propagating signal trough one of the MMI/MZI arms can be modified by a phase delay component 20i realized form metals resistors/thermistors made of TiN or other metal which are located on one of the MMI or MZI arms, said resistors are utilized to heat the waveguide changing the refractive index of the light which passes trough said waveguide In a yet another embodiment said resistors are realized from a doped silicon waveguide area. In a yet further embodiment the heat of said resistors realized from material or doped Si waveguide area, modifies the refractive index depending on the electrical power applied to the switch, where light can exit any of the two output ports. As an example if light enters the switch through input port 1 marked as 20*b*, or input port 2 marked as 20*a*, if no power P is applied on the resistor (P=0, FIG. 17) the optical signal/light exits through output port 2, marked as 20*c* (or output port 1, marked as 20*d*). As the power on the switch is increased (P>0, right), optical signal magnitude light is continuously increases trough the other output port 1 (or output port 2, respectively), as shown at FIG. 18. By further tuning the optical signal magnitude between output port 1 (or port 2) and output port 2 (output port 1) varies from 0 to 100%, until all the light is completely in output port 2 (or output ort, 1 respectively).

In a yet another optional embodiment, the phase and magnitude of each arm can be modified by a PN junction which is fabricated on at least one of the optical arm/waveguide which enable to control the depletion layer inside the waveguide and hence the magnitude and phase of the propagating signal trough said arm.

In a further embodiment, a phase delay element is configured on each of the splitting and switching devices arm. This enable a better control on the propagating magnitude and phase/delay of the propagating signal at that arm.

Figure 19:
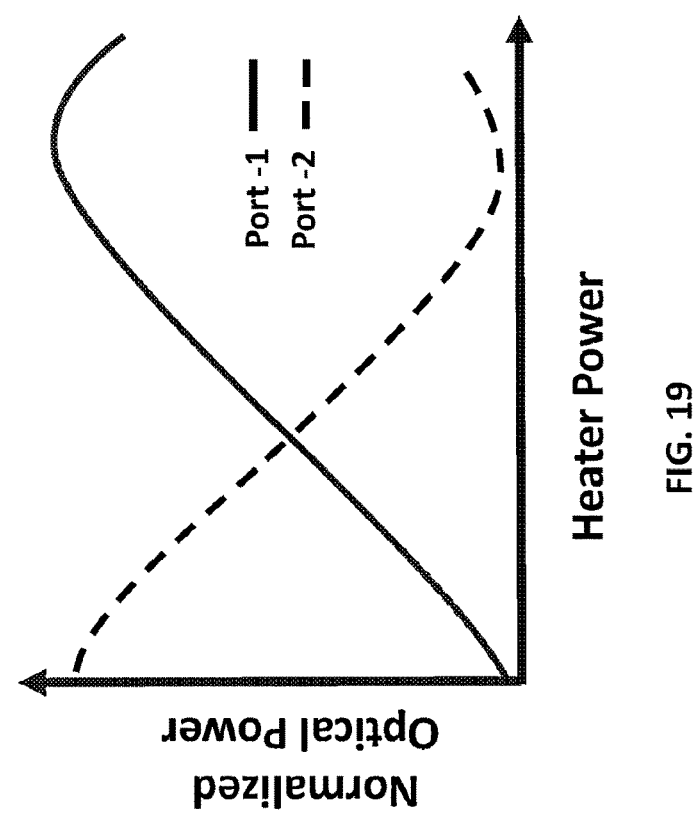

FIG. 19 illustrates a graph of the normalized optical signal magnitude at the outports 20*c* and 20*d* of the switching and splitting device 20 (shown at FIGS. 8*a* and *b*) as a function of the input power magnitude of the heating device 20*i*.

Figure 20:
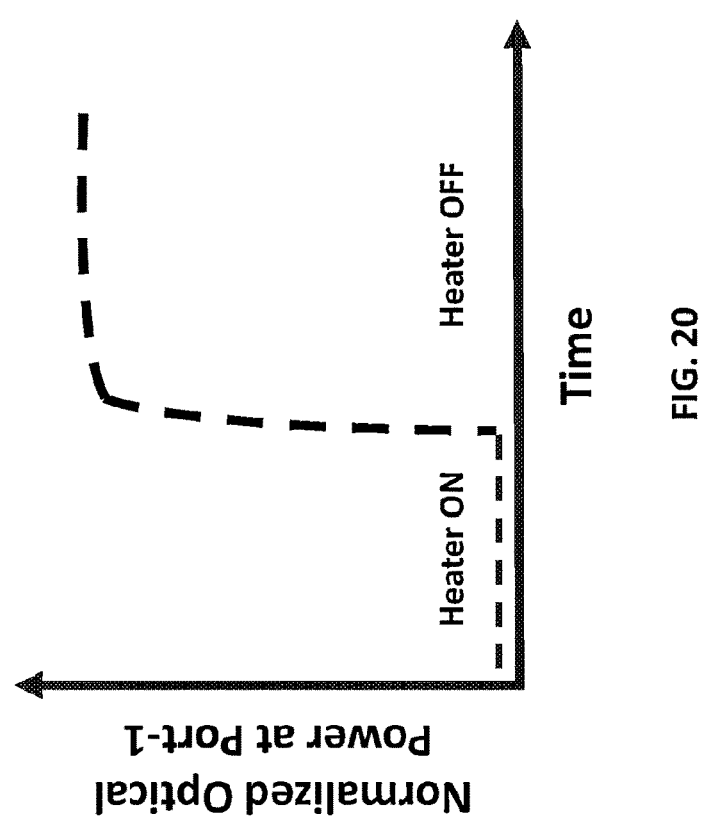
FIGS. 19 and 20 illustrate a graph of the optical signal magnitude versus input power and at time domain, the splitting and switching device.

FIG. 20 shows the optical signal magnitude at the time domain showing that change in the signal phase with and without applied power on heater device 20*i*.

In a further embodiment the disclosed silicon photonics unit s of Silicon or SOI chip 200/201 and silicon photonics unit 100/101 disclosed in FIGS. 1, 3, 5, 7, 11, 13, 15 and 21 further include a compensation element such as phase delay component 20*i* (see FIGS. 2, 4, 6, 8, 12, 14, 16 and 22) wherein in all design this element designed to compensate the phase or magnitude errors between the at least two optical arms.

A System PD for high frequency operational range:

FIG. 21 present further embodiment 201 of system 200 which enable increase the PD velocity/RF transmission response with a high responsivity, as attributed by its architecture disclosed at previous embodiments. In the disclosed design, the PD 4 is able to operate at a higher frequency range, with a higher bandwidth (BW), while its responsivity values are similar to system PD system and invention disclosed at FIGS. 1-8, 11, 13, 15-16, 23*a* and 23*b*. In the disclosed design, the PD system 201 further comprising an inductor 5 electrically connected in series to said PD 4 trough one of its RF/electrical contacts 4*dc* which is through a RF transmission lines 5*a*. In one embodiment, the PD system 201 further comprising a Trans Impedance Amplifier (TIA) 6, wherein the TIA 6 in this case converts the PD photocurrent signal to a voltage signal enabling its modulated data to be by read by a corresponding Receiver (Rx) system. In this design the PD 4 is electrically connected through its Ge contact 4*d* trough an RF transmission lines 5*a* to the inductor 5. The PD is further connected through the transmission line 5*b* to the trough TIA 6 trough one of its dedicated inputs closing the electrical/RF circuit trough the other TL 6*b* to one or both of the PD silicon contact 4*c'*/4*c* PD. In another embodiment the TIA is replaced by a load 6.

In a further embodiment, the inductor 5 and TIA/Load 6 are electrically connected in series to the PD 4. In another embodiment the inductor 5 and are electrically in a combination of series or parallel to the PD so that the transfer function of the PD 6 is modified to increase the electrical and RF properties of the PD. In this case the design consider all unwanted capacitive, inductive and resistive parasitic which are connected to of the system component such as the PD contacts parasitic, the SOI/SI substrate's parasitic, the PD 6 the inductor 5 and TIA/load 6 and other component parasitic of the PD system 201, wherein said parasites can be electrically connected in parallel or in series or any combination thereof to the previous PD system and components. The design target of the system disclosed in FIGS. 21-22 is to increase modify the PD electrical response which is generally limited by its total resistance R and capacitance Cpd and other components and parasitic. In a further embodiment the inductor 5 is designed with a certain inductance L which can operate at high frequencies with low resistive and capacitive parasitic when attached to said PD system 201. In this case the system electrical transfer function which include the PD 4 the inductor 5 the TIA and Load is modified to operate at higher frequency range, wherein in that case where the PD electrical and RF response is limited by the correlated to the time scale response of PD system Trc~Rs*Cpd and the PD transit time of free carriers is fast enough so the Tr is smaller with respect to Trc (Tr<Trc). In this case the bandwidth disclosed PD system 201 can be significantly increased by what is known as an "Inductive peaking" effect in which the electrical/RF frequency response of the system can operate at a higher frequency range when introducing a the inductor 5 into the electrical PD system 201. The main advantage of this system is that its responsivity is almost not impacted by the PD system 201 enabling it to operate at high frequencies with a high responsivity. In a further embodiment the PD system 201 disclosed at FIG. 21-22 is replaced by the system 200 disclosed at FIG. 1 which doesn't include the switching device 22.

There may be provided a waveguide photo detector's Silicon photonics unit that is fabricated on SOI wafer, and may include (a) a waveguide photo detector with at least two input ports; (b) an input optical waveguide to said photo detector's Silicon photonics unit; (c) an optical splitter which can evenly split the optical power of optical signal from said input optical waveguide into at list two optical signal with a same optical power magnitude; and (d) a plurality of optical waveguides which can carry said at least split optical signal from said optical splitter output to said at least two input ports of said waveguide photo detector.

In one embodiment, the photo detector may be evanescently coupled along said at least two optical port to said a plurality of optical waveguides which can carry said at least two splits optical incoming signal;

In another embodiment, the photo detector include a butt coupling architecture design along said at least two optical port to said a plurality of optical waveguides which can carry said at least two splits of the optical incoming signal;

In one embodiment, the waveguide photodetector may be fabricated from Germanium material;

In one embodiment, the optical splitter may be designed from MMI (Multi Mode Interference device) with one input port and at least two waveguide output ports;

In another embodiment, the optical splitter may be designed from a directional coupler with one input port and at least two waveguide output ports;

In one embodiment, the waveguide photodetector system may be integrated inside a receiver device with a plurality of channels wherein each receiver channel comprising a said at least one waveguide photodetector system.

The waveguide photo detector's Silicon photonics unit may include an inductor that is electrically connected in series to a PD trough one of its RF/electrical contacts.

The waveguide photo detector's Silicon photonics unit may include a Trans Impedance Amplifier (TIA) that is in communication with the inductor and may be configured to convert the PD photocurrent signal to a voltage signal enabling its modulated data to be by read by a corresponding Receiver (Rx) system.

The silicon photonics system comprising a PD coupled to a plurality of waveguide ports and a plurality of optical feeding arms, wherein the waveguide PD diode geometrical architecture in the disclosed application and system are design to be fully or at least partially decoupled from the optical design of the waveguides which feed the light into said waveguide PD, wherein in the related design the light direction is fully or partially vertical with respect to the PN PD diode direction.

An example of a calibration method is illustrated below.

The method may be illustrated in regards to a calibrating of PD with at least two optical arms, wherein the optical signal is used for matching the AC pattern on both sides of the photodetector. The Motivation in this case is to detect the fast optical signal (AC/RF) both photodetector inputs need to have the same amplitude and phase (delay). However, due to inherent manufacturing tolerances and various error it is impossible to split the light perfectly between the two inputs and make sure that the difference in phase of the two incoming signal is the same. The delay and/or amplitude in the signal of the inputs can severely impact the detected signal.

In one embodiment, a plurality of phase delay and optical attenuator units which are integrated on at least one of said plurality of optical Arm. In most cases the number of phase delay will be equal or lower by one with respect to number of said optical arms, wherein, said phase delay and optical attenuator can be controlled to apply some phase delay or attenuation magnitude value on said optical signal which propagate on related optical arm.

In a yet further embodiment, the calibration signal is compared to a reference PD which is connected to single optical arm. In one embodiment the reference PD has the same design of the tested PD which are coupled to a plurality of waveguide port. In another embodiment the reference PD can have a design with a known responsivity and electrical and optical properties. In a yet further embodiment, the tested results are compared to a reference PD or to a simulation results of a reference PD, which is connected to single optical arm.

In what follows we disclose a method for calibrating a PD device which is connected by a plurality of optical feeding waveguide ports comprises the following steps es the related method is disclosed for PD connected to at least two optical arms, however can be extended to a PD coupled to any number of optical feeding arms:

a. Performing multiple phase and magnitude transmission measurements that differ from each other by a distribution, made by a switching unit, of optical signals between a first optical path that feeds a first port of a photodiode, and a second optical path that feeds a second port of the photodiode;

b. Comparing the phase and magnitude of each optical arms and also to a related phase and magnitude measurements results of a reference PD which is connected to a single optical arm, where said optical arm have the same or similar design of said plurality of optical feeding arms which are coupled to the tested PD.

c. Determining, based on multiple measurement of the phase and magnitude optical signal the compensation of phase delay and magnitude attenuation scheme of each optical arm.

d. Applying the correction to the plurality of optical phase delay and magnitude on each optical arm to which compensate the deviations of the optical phase and magnitude of each optical arm.

In a further embodiment we add to the method the following steps e. Transmitting a known reference signal data, into the PD which is coupled to the at least two optical arms, measuring the received optical phase and magnitude of received data signal.

f. Comparing said phase and magnitude to the data signal phase and magnitude received by the reference PD which is coupled to a single optical arm.

g. Performing a fine tune corrections trough phase delay and magnitude attenuation units which are integrated on the related plurality of said optical arms so that the received data signal will as similar as possible to the reference data signal.

The method may also include applying the compensation scheme.

The method may include applying the compensation scheme for equalizing the optical properties of the first and second optical paths.

The switching unit may be located downstream to a splitter unit and upstream to the first and second optical paths.

The optical properties may include a phase change introduced by the optical path.

The optical properties may include a delay introduced by the optical path.

The method may include comparing measurements results of the multiple measurements to reference results.

There may be a silicon photonics unit that may include a photoelectric unit and a measuring device. The photoelectric unit may include (i) A splitting and switching device which split an optical signal transmitted through the at least one incoming waveguide into the plurality of said optical feeding waveguides, wherein said splitting and switching device can direct the optical signal transmitted through the input waveguide to one of the plurality of said optical feeding waveguiding structures/optical arms; (ii) a magnitude and phase/delay and signal attenuation devices configured on at least one optical feeding waveguiding structures/optical arms; (iii) a reference PD device attached to a single optical feeding waveguide. The measuring device may be configured to read the photocurrent of the received optical signal generating a visualization of the time or frequency domain of the AC or DC pattern.

There may be provided a method that may include an optical signal that is transmitted through the input waveguide port trough said switching and splitting device selectively to each one of the said plurality of optical feeding waveguiding structure/optical arms, measuring the optical response said PD to that waveguide; wherein the optical delay/phase shift and magnitude are extracted and compared to the reference PD optical response; wherein the comparison on the magnitude and phase resulting resolution in corrections applied through said phase/delay and magnitude attenuation devices which are configured on at least one of said optical feeding waveguiding structures/optical arms.

In a further embodiment, the optical signal, measured in the related calibration procedure marked as "the calibration signal" is transmitted through at least two feeding waveguiding structure/optical arms coupled to said PD. In a further embodiment, the calibration of feeding optical signal comprising a plurality of signal components which are transmitted trough said related optical feeding waveguiding structure/optical arms coupled to said PD.

In a further embodiment, said optical calibration signal is compared via a set of calibration tests which are associated with one or several parameters such as: Optical DC measurements, AC pattern parameters such as the optical signal magnitude and phase/delay. In a further embodiment, further set of parameters can be used for the said calibration procedure such as the signal to noise, the optical modulation magnitude, extinction ratio, the signal TDECQ, FEC or SEC, the signal linearity and time and magnitude nonelinearity impacts.

In a yet further embodiment, said optical splitting device is designed with a switching functionality or alternatively is attached to another switching device which enable to pass the incoming optical calibration signal components trough at least one optical selected arm enabling to measure magnitude and a related phase/delay of each one of optical signal calibration separately received and measured via a delay.

In a yet further embodiment, said optical switching device can modify the magnitude and phase of each of the incoming optical signal which propagate through said corresponding optical arm, where in this can be particularly applied on the incoming optical calibration signal.

In a yet further embodiment, during the calibration step, the magnitude and phase of each optical arm is modified to achieve an optimal signal which is similar to the signal received by a reference device comprising a single waveguide coupled to a reference PD.

In one embodiment, the splitting device composed of an interferometer device which is used to passively split and combine the optical signals and actively control the phase and amplitude of the signal.

In this design split the optical signal either using a directional coupler or an MMI with one input port and two out ports, marked as port-1 and Port-2, respectively. In this design the Directional Coupler is based on evanescently coupled the light from one waveguide to an adjacent one. MMI-Multi Mode Interference device allows the input single mode to evolve into a higher order modes that interfere with each other. We place the outputs per splitting requirements (Figures of directional coupler and MMI).

In a further embodiment, said MMI interferometer device enable: i. To passively split and combine the optical signal and ii. Actively control the phase and amplitude of the signal, compensating for the signal optical Loss and optical phase variation.

In one embodiment, the phase of the light can be actively modified by controlling the refractive index of light inside one of the MMI/MZI waveguides. In a yet further embodiment, the phase and magnitude of the propagating signal trough one of the MMI/MZI arms can be modified by using metals resistors and or thermistors made of TiN or other metal which are located on one of the MMI or MZI arms, wherein said resistors are utilized to heat to heat the waveguide changing the refractive index of the light which passes trough said waveguide.

In a yet another embodiment said resistor which are realized by a doped silicon waveguide area, wherein the heat of the resistor modifies the refractive index depending on the electrical power applied to the switch, where light can exit any of the two output ports. As an example if light enters the switch through input port 1 (or port 2), if no power P is applied (P=0, left) light exits through output port 2 (or port 1). As the power on the switch is increased (P>0, right), light is continuously. By further tuning the optical signal between output port 1 (port 2) and output port 2 (port 1) from 0 to 100%, until all the light is completely in port 2 (port 1).

In a yet another optional embodiment, the phase and magnitude of each arm can be modified by a PN junction which is fabricated on at least one of the optical arm/waveguide which enable to control the depletion layer inside the waveguide and hence the magnitude and phase of the propagating signal trough said arm.

Figure 23A:
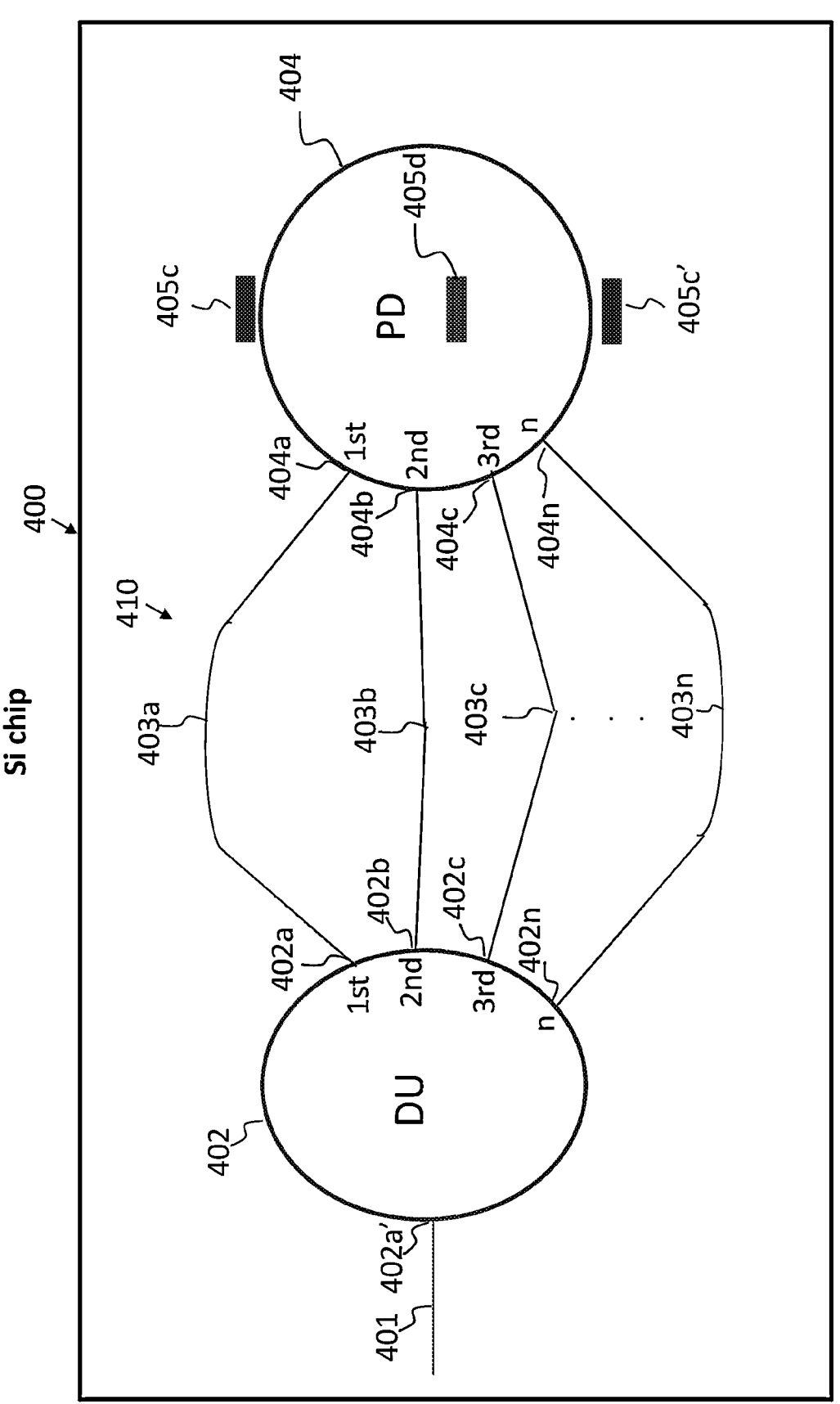
FIGS. 23A and 23B are examples of silicon photonics units.

FIGS. 23A and 34B are an example of a general schematics of the silicon photonics unit with a plurality of input and output optical ports. FIG. 23A illustrates a generalized schematics of an example of a silicon photonics unit 400. The silicon photonics unit is fabricated a Silicon or SOI chip 410 that includes an input waveguide 401, at least two waveguides 403*a*, 403*b*, 403*c* . . . , 403*n*, a DU beam splitter and switching unit 402 and a PD 404. The beam splitter unit 2 is connected to main waveguide 401 along its input port 402*a*' to a plurality of waveguides 403*a*, 403*b*, 403*c* . . . , 403*n* along its corresponding output ports 402*a*, 402*b*, 402*c* . . . 402*n*, a plurality of waveguides 403*a*, 403*b*, 403*c* . . . , 403*n* (refers as well in this application as optical arms) are connected to their corresponding PD input ports 404*a*, 404*b*, 404*c* . . . , 404*n*. The incoming EM radiation is coupled to the input waveguide 401 of the Silicon photonics unit 410. The radiation signal is coupled to the splitter a DU beam splitter and switching unit 402 through its input port 402*a*' and splits into a plurality of components which are coupled through its output ports its corresponding output ports 402*a*, 402*b*, 402*c* . . . 402 to the corresponding plurality waveguides 403*a*, 403*b*, 403*c* . . . , 403*n*, respectively. The EM radiation which propagate trough plurality waveguides 403*a*, 403*b*, 403*c* . . . , 403*n* is coupled into the PD 404 through input corresponding PD input ports 404*a*, 404*b*, 404*c* . . . , 404*n* . . . .

Figure 23B:
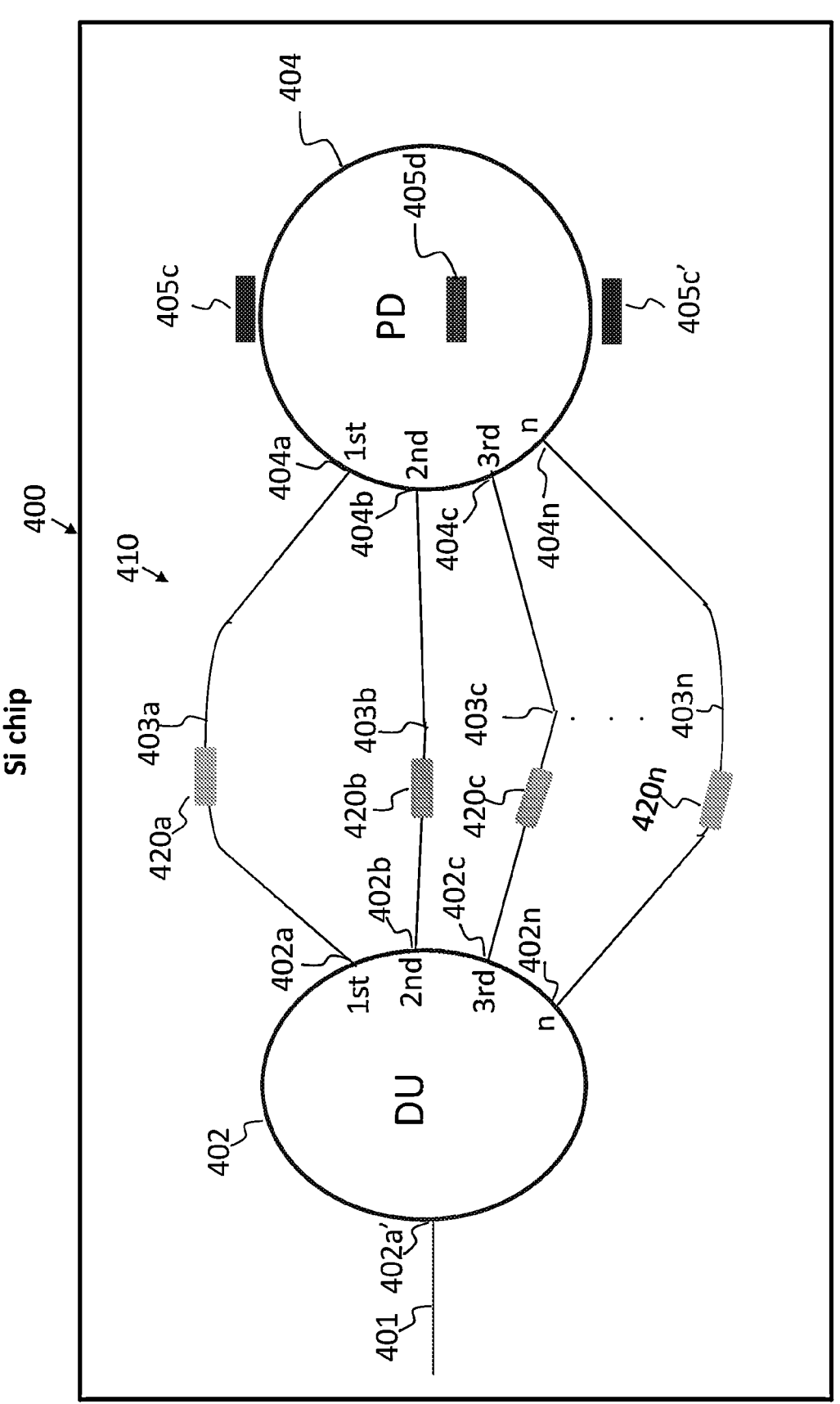

FIG. 23B differs from FIG. 23A by including a corresponding compensating element 420*a*, 420*b*, 420*c* . . . , 420*n* which are integrated on the plurality waveguides 403*a*, 403*b*, 403*c* . . . , 403*n*, respectively In a yet further embodiment, the PD 404 is connected to electrical contacts (405*d*, 405*c*, 405*c*'), as shown in FIGS. 23A and 23B. In the particular case of a PD 405 made of germanium material, the contact to the Si n-implant doping side (405*c*, 405*c*') and are on the same electrical potential and voltage bias where the contact to the Ge PD top side 405*d* which is connected to the positive carrier side p-doping side as shown in FIG. 9. Furthermore, the PD 404 can be connected to the electrical circuit comprising and inductor 5 and a TIA/Load 6 as disclosed in FIGS. 21-22, able to operate at a higher frequency range, with a higher bandwidth (BW), while its responsivity benefit by its optical architecture disclosed in FIGS. 23*a* and *b*.

Method 500 may include step 510 of conveying, by an input waveguide of a silicon photonics unit, an input optical signal.

FIG. 24 illustrates an example of method 500 for optical signal detecting.

Step 510 may be followed by step 520 of receiving the input optical signal, by a distribution unit (DU) of the silicon photonics unit, the input optical signal.

Step 530 may be followed by step 530 of splitting the input optical signal, by a distribution core of the DU, to a first optical signal and a second optical signal.

Step 530 may be followed by steps 540 and 550.

Step 540 may include conveying, by a first optical path that may include a first waveguide, the first optical signal to a first photodetector (PD) optical input port.

Step 550 may include conveying, by a second optical path that may include a second waveguide, the second optical signal to a second PD optical input port.

Steps 540 and 550 are followed by step 560 of generating, by the PD, a PD output signal indicative of the first optical signal and the second optical signal.

The PD may include a n doped region, a p doped region and a detection region that may be positioned, along a first virtual axis, between the n doped region and the p doped region; wherein the first optical signal and the second optical signal propagate towards the detection region, along a plane that may be oriented in relation to the first vertical axis by about ninety degrees; wherein the PD may be set in reverse bias.

Method 500 may include step 570 (dashed box) of compensating, by one or more compensation elements, for at least one error related to the first optical signal and the second optical signal. The compensating is executed prior to step 560.

The compensating may include compensating for at least one error related to the first optical signal and the second optical signal.

An error of the at least one error may be a DU splitting related error.

An error of the at least one error may be a mismatch between the first and second optical paths.

Method 500 may include nullifying, by the distribution core, an optical signal of the first optical signal and the second optical signal. In this case the coupler acts like a switch and one step out of steps 540 and 550 does not convey any signal.

Method 500 may include step 580 of calibrating the silicon photonics unit by reducing a gap between phase and/or amplitude characteristics of the first optical path and between corresponding phase and/or amplitude characteristics of the second optical path.

Step 580 may include performing multiple calibration iterations.

Step 580 may include introducing, during at least some of the multiple calibration iterations, different phase and/or amplitude differences between the first optical signal and the second optical signal.

Step 580 may include introducing, during at least some of the multiple calibration iterations, different phase and/or amplitude characteristics differences between the first optical path and the second optical path.

Step 580 may include comparing the PD output signals generated by the PD during the multiple calibration iterations to reference PD output signals generated by a reference PD having a single reference PD optical input.

FIG. 25 illustrates an example of method 400 for optical signal detecting.

Method 600 may start by step 510 of conveying, by an input waveguide of a silicon photonics unit, an input optical signal.

Step 510 may be followed by step 520 of receiving the input optical signal, by a distribution unit (DU) of the silicon photonics unit, the input optical signal.

Step 520 may be followed by step 630 of applying, by the distribution core of the DU, one or more distribution operations on the input optical signal to provide at least one DU output signal. Thus-step 630 may provide a first optical signal and a second optical signal, may provide only the first optical signal or may provide only the second optical signal.

Step 630 may be followed by step 640 of conveying, over at least one optical path of a first optical path and a second optical path, the at least one DU output signal to at least one photodetector (PD) optical input port of a PD. The first optical path may include a first waveguide. The second optical path may include a second waveguide.

Step 640 may be followed by step 650 of generating, by the PD, a PD output signal indicative of the at least one DU output signal.

Thus, the PD output signal may be indicative of the first and second optical signals, only the first optical signal or only the second optical signal.

Method 600 may include step 570 (dashed box) of compensating, by one or more compensation elements, for at least one error related to the first optical signal and the second optical signal. The compensating is executed prior to step 650.

Method 600 may include step 580 of calibrating the silicon photonics unit by reducing a gap between phase and/or amplitude characteristics of the first optical path and between corresponding phase and/or amplitude characteristics of the second optical path.

FIG. 26 illustrates an example of method 700 for calibrating a silicon photonics unit.

Method 700 may include step 710 of preforming multiple calibration iterations.

Step 710 may be followed by step 720 of reducing, based on outcomes of the multiple calibration iterations, a gap between (i) phase and/or amplitude characteristics of a first optical path of the silicon photonics unit and (ii) corresponding phase and/or amplitude characteristics of a second optical path of the silicon photonics unit.

It should be noted that many iterations of steps 710 and 720 may be executed.

The silicon photonics unit may be any of the mentioned above silicon photonics units.

For example—the silicon photonics unit may also include (in addition to the first and second optical paths)—an input waveguide that may be configured to convey an input optical signal; a distribution unit (DU) that may include a DU input port, a first DU output port, a second DU output port and a distribution core; wherein the distribution core may be configured to receive the input optical signal, split the input optical signal to a first optical signal and a second optical signal, provide the first optical signal to the first DU output port and provide the second optical signal to the second DU output port; and a photodetector (PD) that may include a first optical input port, a second optical input port, and an electrical output port; wherein the PD may be configured to output, via the PD output port, a PD output signal indicative of the first optical signal and the second optical signal. The first optical path may include a first waveguide and may be configured to convey the first optical signal to the PD's first optical input port. The second optical that may include a second waveguide and may be configured to convey the second optical signal to the PD's second optical input port.

Step 710 may include introducing, during at least some of the multiple calibration iterations, different phase and/or amplitude differences between the first optical signal and the second optical signal. This can be done by a coupler of the DU, a switch of the DU, any delay unit and/or phase shifter located anywhere in the silicon photonics unit.

Step 710 may include introducing, during at least some of the multiple calibration iterations, different phase and/or amplitude characteristics differences between the first optical path and the second optical path.

A phase and/or amplitude characteristic may be the phase difference and/or a delay introduced to an optical signal that passes through an optical path.

Step 710 may include comparing the PD output signals generated by the PD during the multiple calibration iterations to reference PD output signals generated by a reference PD having a single reference PD optical input.

The DU map generate more than two optical signals that propagate over more than two optical paths and the PD may be fed (at more than two locations) by the more than two optical signals. Any reference to two optical signals (first optical signal and second optical signal) should be applied mutatis mutandis to more than two optical signals. Any reference to two optical paths (first optical path and second optical path) should be applied mutatis mutandis to more than two optical paths. Any reference to a PD that receives two optical signals at two sides should be applied mutatis mutandis to a PD that receives more than two optical signals at more than two locations—for example at more than two sides.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A silicon photonics unit that comprises:
an input waveguide that is configured to convey an input optical signal;
a distribution unit (DU) that comprises a DU input port, a first DU output port, a second DU output port and a distribution core; wherein the distribution core is configured to receive the input optical signal, split the input optical signal to a first optical signal and a second optical signal, provide the first optical signal to the first DU output port and provide the second optical signal to the second DU output port;

a photodetector (PD) that comprises a first optical input port, a second input port, and an electrical output port; wherein the PD is configured to output, via the PD output port, a PD output signal indicative of the first optical signal and the second optical signal;
a first optical path that comprises a first waveguide and is configured to convey the first optical signal to the PD's first optical input port;
a second optical path that comprises a second waveguide and is configured to convey the second optical signal to the PD's second optical input port; and
one or more compensation elements that are configured to compensate for at least one error related to the first optical signal and the second optical signal; wherein a compensating element of one or more compensation elements is included in the PD.

2. The silicon photonics unit according to claim 1 wherein the PD comprises a n-doped region, a p-doped region and a detection region that is positioned, along a first virtual axis, between the n-doped region and the p-doped region; wherein the first optical signal and the second optical signal propagate towards the detection region, along a plane that is oriented in relation to the first vertical axis by about ninety degrees; wherein the PD is set in reverse bias.

3. The silicon photonics unit according to claim 2 wherein the about ninety degrees ranges between sixty and one hundred and twenty degrees.

4. The silicon photonics unit according to claim 1, comprising one or more compensation elements that are configured to compensate for at least one error related to the first optical signal and the second optical signal.

5. The silicon photonics unit according to claim 1, wherein an error of the at least one error is a DU splitting related error.

6. The silicon photonics unit according to claim 1, wherein an error of the at least one error is a mismatch between the first and second optical paths.

7. The silicon photonics unit according to claim 1, wherein the one or more compensating elements are included in one or more optical paths of the first optical path and the second optical path.

8. The silicon photonics unit according to claim 1, wherein another a compensating element of the one or more compensating elements is included an optical path of the first optical path and the second optical path.

9. The silicon photonics unit according to claim 1, wherein the one or more compensation elements comprise one or more delay units.

10. The silicon photonics unit according to claim 1, wherein the one or more compensation elements comprise one or more amplitude changing units.

11. The silicon photonics unit according to claim 1, wherein the one or more compensation elements are configured to maintain a requested split ratio between the first optical signal and the second optical signal and to eliminate a propagation delay between the first optical signal and the second optical signal.

12. The silicon photonics unit according to claim 1, wherein the PD's first optical input port and the PD's second optical input port are located at opposite sides of a detection region of the PD.

13. The silicon photonics unit according to claim 12 wherein the detection region is butt coupled.

14. The silicon photonics unit according to claim 12, wherein the detection region is evanescently coupled.

15. The silicon photonics unit according to claim 12, wherein the PD comprises two optical input ports, wherein the PD's first optical input port and the PD's second optical input port are located at opposite sides of a detection region of the PD.

16. The silicon photonics unit according to claim 12, wherein the PD comprises a first electrical port and a second electrical port; wherein the first electrical port and the second electrical port are located at other opposite sides of the detection region.

17. The silicon photonics unit according to according to claim 12, wherein the DU is a splitter.

18. A method for optical signal detecting, the method comprising:

conveying, by an input waveguide of a silicon photonics unit, an input optical signal;

receiving the input optical signal, by a distribution unit (DU) of the silicon photonics unit, the input optical signal;

splitting the input optical signal, by a distribution core of the DU, to a first optical signal and a second optical signal;

conveying, by a first optical path that comprises a first waveguide, the first optical signal to a first photodetector (PD) optical input port;

conveying, by a second optical path that comprises a second waveguide, the second optical signal to a second PD optical input port;

generating, by the PD, a PD output signal indicative of the first optical signal and the second optical signal; and compensating, by one or more compensation elements, for at least one error related to the first optical signal and the second optical signal; wherein a compensating element of one or more compensation elements is included in the PD.

19. The method according to claim 18 wherein the PD comprises a n-doped region, a p-doped region and a detection region that is positioned, along a first virtual axis, between the n-doped region and the p-doped region; wherein the first optical signal and the second optical signal propagate towards the detection region, along a plane that is oriented in relation to the first vertical axis by about ninety degrees; wherein the PD is set in reverse bias.

* * * * *